United States Patent
Pan et al.

(10) Patent No.: US 12,245,270 B2
(45) Date of Patent: *Mar. 4, 2025

(54) INITIAL ACCESS AND CHANNEL ACCESS IN NEW RADIO/NEW RADIO-UNLICENSED (NR/NR-U)

(71) Applicant: InterDigital Patent Holdings, Inc., Wilmington, DE (US)

(72) Inventors: Kyle Jung-Lin Pan, Saint James, NY (US); Fengjun Xi, San Diego, CA (US); Chunxuan Ye, San Diego, CA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/494,118

(22) Filed: Oct. 25, 2023

(65) Prior Publication Data

US 2024/0057149 A1    Feb. 15, 2024

Related U.S. Application Data

(63) Continuation of application No. 17/845,617, filed on Jun. 21, 2022, now Pat. No. 11,844,105, which is a (Continued)

(51) Int. Cl.
*H04W 74/00* (2009.01)
*H04W 56/00* (2009.01)
(Continued)

(52) U.S. Cl.
CPC ....... *H04W 74/002* (2013.01); *H04W 56/001* (2013.01); *H04W 72/30* (2023.01); *H04W 74/0833* (2013.01)

(58) Field of Classification Search
CPC ............. H04W 56/001; H04W 74/002; H04W 74/0833; H04W 72/30; H04W 74/006; H04W 74/0838
See application file for complete search history.

(56) References Cited

U.S. PATENT DOCUMENTS 8,014,359 B2    9/2011    Cave et al.
8,570,902 B2    10/2013    Du et al.
(Continued)

FOREIGN PATENT DOCUMENTS

CN    105009479 A    10/2015
JP    2015-002403 A    1/2015
(Continued)

OTHER PUBLICATIONS

3rd Generation Partnership Project, "Configurations and Location Mapping for TDD PRACH", ZTE et al., TSG-RAN WG1 #52bis, Shenzhen, China, R1-081421, Mar. 31-Apr. 4, 2008.
(Continued)

*Primary Examiner* — Kan Yuen
(74) *Attorney, Agent, or Firm* — Flaster Greenberg, P.C.

(57) ABSTRACT

Methods, systems, and devices for addressing collisions of possible random access channel (RACH) occasions. A wireless transmit receive unit (WTRU) may receive an indication of semi-static UL/DL information including configuration of RACH occasions in a remaining minimum system information (RMSI) and an indication of one or more actually transmitted synchronization signal (SS) blocks. The WTRU may then assess whether there are RACH occasions based on the configuration information and determine whether any of the RACH occasions are valid, wherein the RACH occasion may be valid based on Based on the RACH occasion is after all actually transmitted SS blocks indicated and/or whether an SS block override is disabled or enabled.
(Continued)

The WTRU may transmit a RACH in one or more of the RACH occasions that have been determined to be valid.

20 Claims, 15 Drawing Sheets

Related U.S. Application Data continuation of application No. 16/767,322, filed as application No. PCT/US2018/062544 on Nov. 27, 2018, now Pat. No. 11,405,950.

(60) Provisional application No. 62/630,692, filed on Feb. 14, 2018, provisional application No. 62/590,936, filed on Nov. 27, 2017.

(51) Int. Cl.
    *H04W 72/30*      (2023.01)
    *H04W 74/0833*    (2024.01)

(56) References Cited

U.S. PATENT DOCUMENTS

| | | |
|---|---|---|
| 9,788,332 B2 | 10/2017 | Nagata et al. |
| 10,555,347 B2 | 2/2020 | Xia |
| 2011/0013542 A1 | 1/2011 | Yu et al. |
| 2011/0096748 A1 | 4/2011 | Meyer et al. |
| 2013/0201960 A1 | 8/2013 | Kim et al. |
| 2014/0334371 A1 | 11/2014 | Kim et al. |
| 2015/0181546 A1 | 6/2015 | Freda et al. |
| 2015/0358138 A1 | 12/2015 | Hwang et al. |
| 2015/0359003 A1 | 12/2015 | Kim et al. |
| 2017/0231011 A1 | 8/2017 | Park et al. |
| 2017/0238362 A1 | 8/2017 | Karandikar et al. |
| 2017/0280484 A1 | 9/2017 | Awad |
| 2017/0325260 A1 | 11/2017 | Guo et al. |
| 2019/0037605 A1 | 1/2019 | Agiwal et al. |
| 2019/0053381 A1 | 2/2019 | Wang et al. |
| 2019/0110242 A1* | 4/2019 | Islam .............. H04J 11/0069 |
| 2019/0110314 A1 | 4/2019 | Abedini et al. |
| 2019/0132857 A1 | 5/2019 | Babaei et al. |
| 2019/0208550 A1 | 7/2019 | Ko et al. |
| 2020/0107275 A1 | 4/2020 | Cho et al. |
| 2020/0275479 A1* | 8/2020 | Peisa .............. H04W 74/04 |
| 2020/0281017 A1 | 9/2020 | Ohara |
| 2020/0288503 A1 | 9/2020 | Sahlin et al. |
| 2020/0296765 A1 | 9/2020 | Kim et al. |
| 2020/0396654 A1 | 12/2020 | Freda et al. |
| 2021/0127324 A1 | 4/2021 | Agiwal et al. |
| 2021/0352734 A1 | 11/2021 | Svedman et al. |

FOREIGN PATENT DOCUMENTS

| | | |
|---|---|---|
| JP | 2017-506479 A | 3/2017 |
| WO | WO 2013/138701 A2 | 9/2013 |
| WO | 2017022870 A1 | 2/2017 |
| WO | WO 2017/155238 A1 | 9/2017 |
| WO | WO 2019/082152 A1 | 5/2019 |
| WO | WO 2019/097661 A1 | 5/2019 |

OTHER PUBLICATIONS

3rd Generation Partnership Project, "Considerations on Random Access for NR Unlicensed Spectrum", Interdigital Inc., 3GPP TSG RAN WG1 Meeting 92, Athens, Greece, R1-1802648, Feb. 26-Mar. 2, 2018.
3rd Generation Partnership Project, "Discussion on PRACH preamble format details", LG Electronics, 3GPP TSG RAN WG1 Meeting #91 Reno, USA, R1-1719897, Nov. 27-Dec. 1, 2017.
3rd Generation Partnership Project, "Discussion on remaining details on PRACH formats", NTT DOCOMO, INC., 3GPP TSG RAN WG1 Meeting 90bis Prague, CZ, R1-1718183, Oct. 9-13, 2017.
3rd Generation Partnership Project, "On Initial Access for NR Unlicensed Spectrum", Interdigital Inc., 3GPP TSG RAN WG1 Meeting #93, Busan, South Korea, R1-1807037, May 21-25, 2018.
3rd Generation Partnership Project, "On Random Access for NR Unlicensed Spectrum", Interdigital Inc., 3GPP TSG RAN WG1 Meeting #92bis, Sanya, China, R1-1804887, Apr. 16-20, 2018.
3rd Generation Partnership Project, "On Remaining Details of NR Physical Random Access Channel", Interdigital Inc., 3GPP TSG RAN WG1 Meeting #93, Busan, South Korea, R1-1807011, May 21-25, 2018.
3rd Generation Partnership Project, "Physical Layer Procedures for Control", Technical Specification Group Radio Access Network; NR; Physical layer procedures for control (Release 15), 3GPP TS 38.213 V15.3.0, Sep. 2018, 101 pages.
3rd Generation Partnership Project, "Physical Layer Procedures for Control", Technical Specification Group Radio Access Network; NR; (Release 15) 3GPP TS 38.213 V1.0.0, Sep. 2017, 16 pages.
3rd Generation Partnership Project, "Physical Layer Procedures for Control", Technical Specification Group Radio Access Network; NR; (Release 15) 3GPP TS 38.213 V1.1.0, Oct. 2017, 21 pages.
3rd Generation Partnership Project, "PRACH Resource Configuration", ZTE et al., 3GPP TSG RAN WG1 Meeting #91, Reno, USA, XP051369274, R1-1719345, Nov. 27-Dec. 1, 2017, 22 pages.
3rd Generation Partnership Project, "RACH procedure", LG Electronics, 3GPP TSG RAN WG1 Meeting #91, Reno, USA, R1-1719898, Nov. 27-Dec. 1, 2017.
3rd Generation Partnership Project, "Remaining Details for Physical Random Access Channel", Interdigital Inc., 3GPP TSG RAN WG1 Meeting 92, Sanya, China, R1-1804842, Apr. 16-20, 2018.
3rd Generation Partnership Project, "Remaining details on NR-RACH capacity", 3GPP TSG RAN WGI Meeting #91, Reno, Nevada, US, XP051370319, R1-1720945, Nov. 27-Dec. 1, 2017, 11 Pages.
3rd Generation Partnership Project, "Remaining details on NR-RACH formats and configurations" 3GPP TSG RAN WGI Meeting #91, Reno, Nevada, US, XP051370314, R1-1720940, Nov. 18, 2017, 30 Pages.
3rd Generation Partnership Project, "Remaining Details on PRACH Formats", 3GPP TSG-RAN WG1 Meeting #91, R1-1720652, Nov. 27-Dec. 2, 2017, 21 pages.
3rd Generation Partnership Project, "Remaining details on PRACH formats", NTT DOCOMO, INC., 3GPP TSG RAN WG1 Meeting #91, Reno, USA, R1-1720794, Nov. 18, 2017.
3rd Generation Partnership Project, "Remaining Details on PRACH Formats", Qualcomm Incorporated, 3GPP TSGRAN WG1 Meeting #91, Reno, Nevada, USA, R1-17120652, Nov. 27-Dec. 2, 2017.
3rd Generation Partnership Project, "Remaining details on PRACH procedure", Samsung; 3GPP TSG RAN WG1 Meeting 90bis Prague, CZ, R1-1717582, Oct. 9-13, 2017.
3rd Generation Partnership Project, "Remaining details on RA procedure", Fujitsu, 3GPP TSG RAN WG1 Meeting #91, Reno, USA, R1-1719617, Nov. 17, 2017.
3rd Generation Partnership Project, "Remaining details on random access procedure", Motorola Mobility, Lenovo, 3GPP TSG RAN WG1, R1-1720922, Nov. 27-Dec. 1, 2017, 5 pages.
3rd Generation Partnership Project, "Technical Specification Group Radio Access Network; NR; Medium Access Control (MAC) protocol specification (Release 15)", 3GPP TS 38.321 V15.3.0, Sep. 2018.
3rd Generation Partnership Project, "Technical Specification Group Radio Access Network; NR; Radio Resource Control (RRC); Protocol specification (Release 15)", 3GPP TS 38.331 V0.1.0, Oct. 2017.
3rd Generation Partnership Project, "Technical Specification Group Radio Access Network; NR; Radio Resource Control (RRC); Protocol specification (Release 15)", 3GPP TS 38.331 V15.3.0, Sep. 2018.
3rd Generation Partnership Project, Technical Specification Group Radio Access Network; NR; Medium Access Control (MAC) protocol specification (Release 15), 3GPP TS 38.321 V1.1.0, Nov. 2017.
IEEE Standard for Information technology "Wireless LAN Medium Access Control (MAC) and Physical Layer (PHY) specifications;

(56) References Cited

OTHER PUBLICATIONS

Amendment 5: Television White Spaces (TVWS) Operation", Telecommunications and information exchange between systems—Local and metropolitan area networks—Specific requirements; Part 11, IEEE 802.11af-2013, Dec. 11, 2013.

IEEE Standard for Information technology, "Wireless LAN Medium Access Control (MAC) and Physical Layer (PHY) Specifications", Telecommunications and information exchange between systems—Local and metropolitan area networks—Specific requirements; Part 11, IEEE Std. 802.11-2016, Dec. 7, 2016.

IEEE Standard for Information technology, "Wireless LAN Medium Access Control (MAC) and Physical Layer (PHY) Specifications; Amendment 2: Sub 1 GHz License Exempt Operation", Telecommunications and information exchange between systems Local and metropolitan area networks—Specific requirements; Part 11, IEEE 802.11ah- 2016, Dec. 7, 2016.

IEEE Standard for Information technology, "Wireless LAN Medium Access Control (MAC) and Physical Layer (PHY) Specifications; Amendment 4: Enhancements for Very High Throughput for Operation in Bands below 6GHz", Telecommunications and information exchange between systems—Local and metropolitan area networks—Specific requirements; Part 11, IEEE Std 802.11ac-2013, Dec. 11, 2013.

IEEE Standard for Information technology, "Wireless LAN Medium Access Control (MAC) and Physical Layer (PHY) Specifications; Amendment 5: Enhancements for Higher Throughput", Telecommunications and information exchange between systems—Local and metropolitan area networks—Specific requirements; Part 11, IEEE Std 802.11n-2009, Sep. 2009.

International Telecommunication Union, "IMT Vision—Framework and overall objectives of the future development of IMT for 2020 and beyond; M Series Mobile, radio determination, amateur and related satellite services", Recommendation ITU-R M.2083-0, Sep. 2015.

3rd Generation Partnership Project (3GPP), "RACH in Multibeam System", Nokia, Alcatel-Lucent Shanghai Bell, 3GPP TSG-RAN WG2 Meeting #97bis Spokane, USA, R2-1703553, Apr. 3-7, 2017, 5 pages.

* cited by examiner

INITIAL ACCESS AND CHANNEL ACCESS IN NEW RADIO/NEW RADIO-UNLICENSED (NR/NR-U)

CROSS REFERENCE TO RELATED APPLICATIONS

This application is a continuation of U.S. Non-Provisional application Ser. No. 17/845,617, filed Jun. 21, 2022, which is a continuation of U.S. Non-Provisional application Ser. No. 16/767,322, filed May 27, 2020, which issued as U.S. Pat. No. 11,405,950 on Aug. 2, 2022, which is the U.S. National Stage, under 35 U.S.C. § 371, of International Application No. PCT/US2018/062544, filed Nov. 27, 2018, which claims the benefit of U.S. Provisional Application No. 62/630,692, filed Feb. 14, 2018, and U.S. Provisional Application No. 62/590,936, filed Nov. 27, 2017, the contents of which are hereby incorporated by reference herein.

BACKGROUND

Fifth generation (5G) wireless systems are the next telecommunications standards beyond fourth generation (4G) standards. 5G generally aims at higher capacity than 4G, allowing a higher density of mobile broadband users, greater reliability, and supporting device-to-device and massive machine communications. Based on general requirements set out by International Telecommunication Union Radio communication (ITU-R), Next Generation Mobile Networks (NGMN) and 3rd Generation Partnership Project (3GPP), a broad classification of use cases for 5G systems may include enhanced mobile broadband (eMBB), massive machine type communications (mMTC), and ultra-reliable and low latency communications (URLLC). These use cases may focus on different requirements such as high data rate, high spectrum efficiency, low power and high energy efficiency, low latency, and high reliability. A wide range of spectrum bands ranging from 700 MHz to 80 GHz may be considered for a variety of these deployment scenarios.

As carrier frequencies increase, severe path loss may become a crucial limitation to guarantee the sufficient coverage of wireless devices. For example, transmission in millimeter wave systems may suffer from non-line-of-sight losses such as diffraction loss, penetration loss, oxygen absorption loss, foliage loss, and the like. During initial access, a base station (BS) and a wireless transmit receive unit (WTRU) may need to overcome these high path losses and discover each other. Utilizing dozens or even hundreds of antenna elements to generate beam-formed signals in 5G wireless systems is an effective way to compensate the severe path loss by providing significant beam forming gain. However, these beam-formed signals may collide with each other during initial access or random access procedures. For example, synchronization signal (SS) blocks, random access channel (RACH) resources, control channels (DL/UL) and/ or data channel (DL/UL) may collide with each other in 5G scenarios.

SUMMARY

Methods, systems, and devices for addressing collisions of possible random access channel (RACH) occasions. A wireless transmit receive unit (WTRU) may receive an indication of semi-static UL/DL information including configuration of RACH occasions in a remaining minimum system information (RMSI) via a PBCH and an indication of one or more actually transmitted synchronization signal (SS) blocks. The WTRU may then assess whether there are RACH occasions based on the configuration information and determine whether any of the RACH occasions are valid, wherein the RACH occasion may be valid based on Based on the RACH occasion is after all actually transmitted SS blocks indicated and/or whether an SS block override is disabled or enabled. The WTRU may transmit a RACH in one or more of the RACH occasions that have been determined to be valid.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
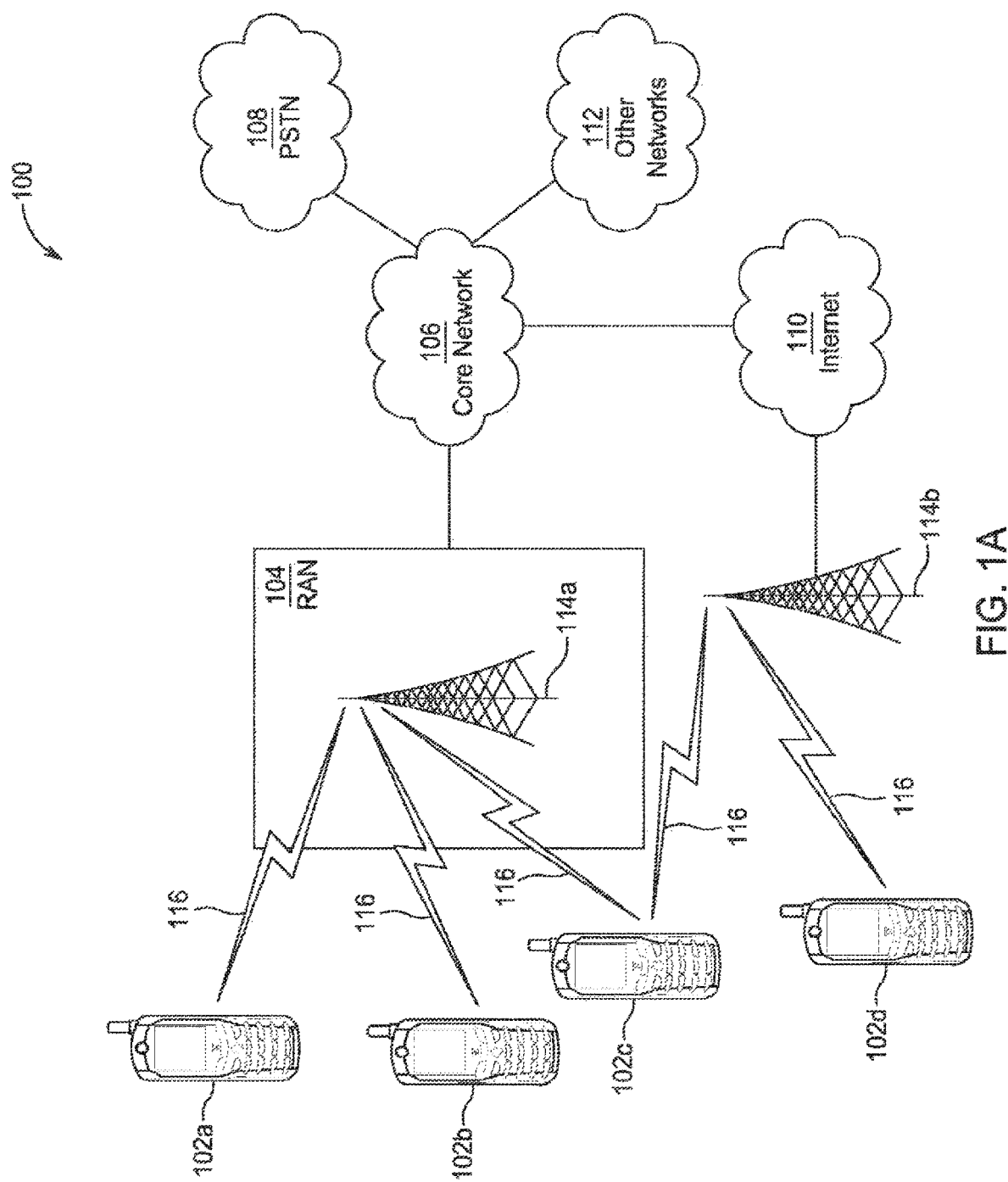
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA 20001X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
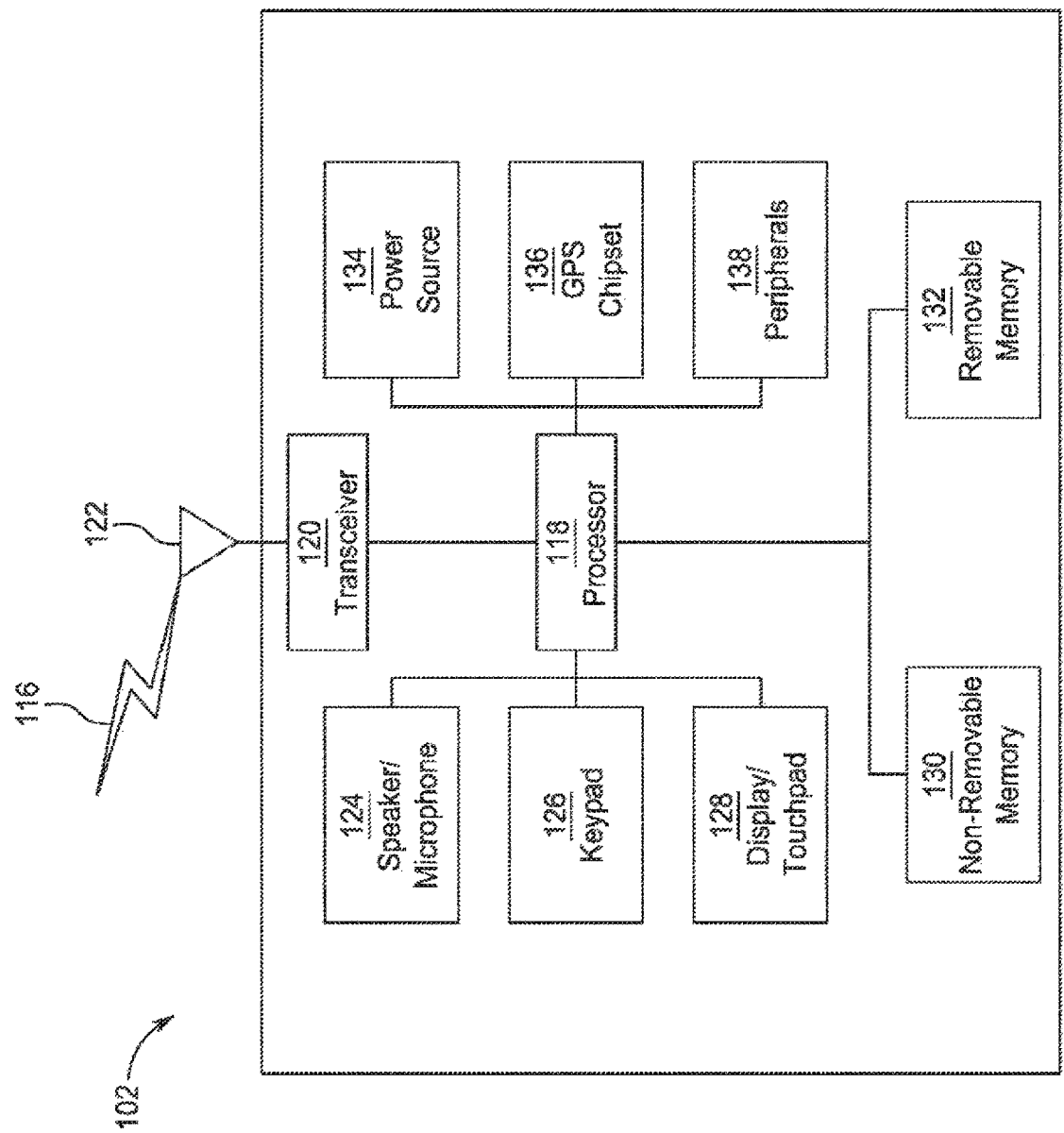
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD)

memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the uplink (UL) (e.g., for transmission) and downlink (DL) (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
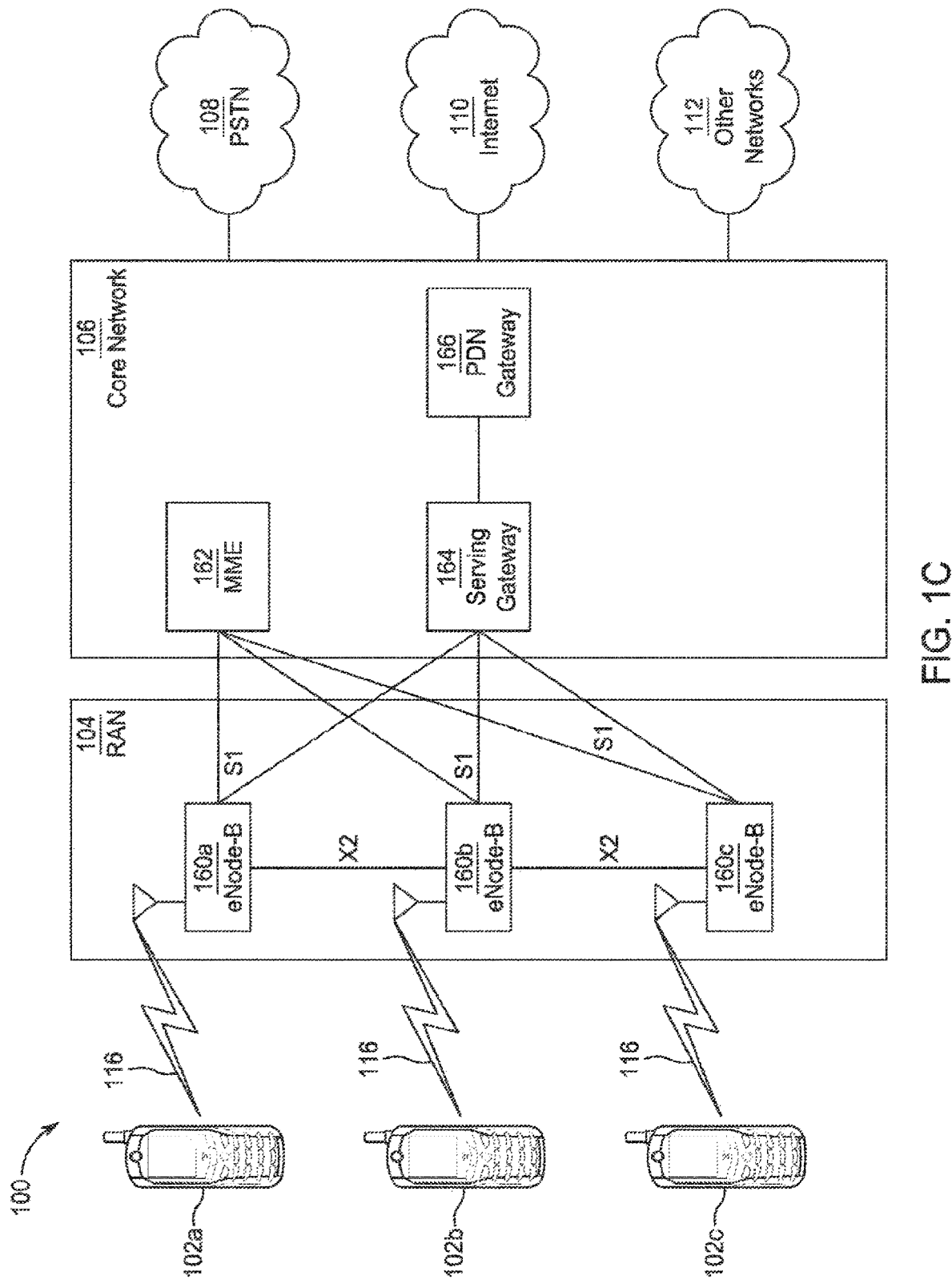
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
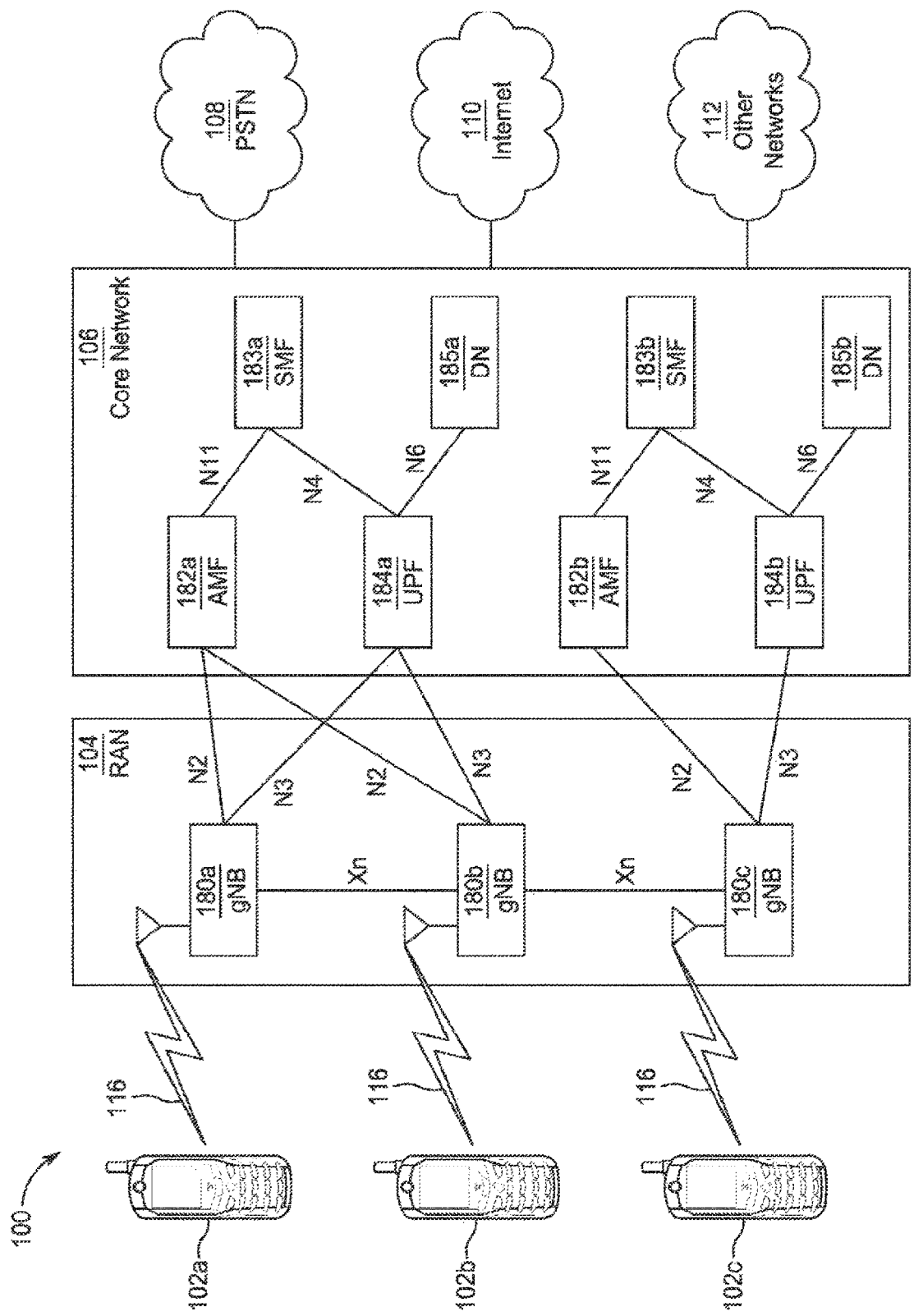
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102*a*, 102*b*, 102*c* over the air interface 116. The RAN 113 may also be in communication with the CN 115.

The RAN 113 may include gNBs 180*a*, 180*b*, 180*c*, though it will be appreciated that the RAN 113 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 108*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (CoMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

A radio access network (RAN) may be part of a mobile telecommunication system providing wireless transmit receive units (WTRUs) with connection to its core network (CN). In fifth generation (5G) or next generation (NG) wireless systems, the RAN may be referred to as New Radio (NR) RAN or next generation RAN. Based on the general requirements set out by ITU-R, NGMN and 3GPP, a broad classification of use cases for NR may be Enhanced Mobile Broadband (eMBB), Massive Machine Type Communications (mMTC), and Ultra Reliable and Low latency Communications (URLLC). Different use cases may focus on different requirements such as higher data rate, higher spectrum efficiency, low power and higher energy efficiency, lower latency, and higher reliability. A wide range of spectrum bands ranging from 700 MHz to 80 GHz may be considered for a variety of deployment scenarios.

As carrier frequency increases severe path loss may become a crucial limitation to guarantee sufficient coverage. Transmission in millimeter wave systems may additionally suffer from non-line-of-sight losses, for example, diffraction loss, penetration loss, Oxygen absorption loss, foliage loss, and the like. During initial access, a base station and a WTRU may need to overcome these high path losses and discover each other, or a WTRU may need to discover another WTRU. Utilizing dozens or even hundreds of antenna elements to generate a beam formed signal may be an effective way to compensate the severe path loss by providing significant beam forming gain. Beamforming techniques may include digital, analogue, and hybrid beamforming.

Long Term Evolution (LTE), and other wireless systems, may use initial synchronization and broadcast channels. Cell search may be used by a WTRU to acquire time and frequency synchronization within a cell and detect the Cell ID of that cell. Synchronization signals, such as LTE, may be transmitted in the 0th and 5th subframes of every radio frame and may be used for time and frequency synchronization during initialization. As part of the system acquisition process, a WTRU may synchronize sequentially to the OFDM symbol, slot, subframe, half-frame, and/or radio frame based on the synchronization signals. There may be two synchronization signals: a primary synchronization signal (PSS) and a secondary synchronization signal (SSS). The PSS may be used to obtain slot, subframe, and half-frame boundary. It may also provide physical layer cell identity (PCI) within the cell identity group. The SSS may be used to obtain the radio frame boundary. It may also enable the WTRU to determine the cell identity group, which may range from 0 to 167.

Following a successful synchronization and PCI acquisition, the WTRU may decode a channel, such as a Physical Broadcast Channel (PBCH), with the help of cell-specific reference signals (CRS) and acquire the master information block (MIB) information regarding system bandwidth, System Frame Number (SFN) and PHICH configuration. LTE synchronization signals and PBCH may be transmitted continuously according to the standardized periodicity.

LTE, and other wireless systems, may utilize random access (RA) procedures. A base station (e.g., eNodeB, eNB, gNB) and/or a WTRU may use a random access procedure for at least one of: WTRU initial access (e.g., to a cell or eNB); reset of UL timing (e.g., to reset or align WTRU UL timing with respect to a certain cell); and/or reset of timing during handover (e.g., to reset or align WTRU timing with respect to the handover target cell). The WTRU may transmit a certain physical random access channel (PRACH) preamble sequence at a certain power PRACH, which may be based on configured parameters and/or measurements, and the WTRU may transmit the preamble using a certain time-frequency resource or resources. The configured parameters, which may be provided or configured by the eNB, may include one or more of an initial preamble power (e.g., preambleInitialReceivedTargetPower), a preamble format based offset (e.g., deltaPreamble), a random access response window (e.g., ra-ResponseWindowSize), a power ramping factor (e.g., powerRampingStep), and/or a maximum number of retransmissions (e.g., preambleTransMax). The PRACH resources, which may include preambles or sets of preambles and/or time/frequency resources that may be used for preamble transmission, may be provided or configured by the eNB. The measurements may include path loss. The time-frequency resource(s) may be chosen by the WTRU from an allowed set or may be chosen by the eNB and signaled to the WTRU. Following the WTRU transmission of a preamble, if the eNB detects the preamble, it may respond with a random access response (RAR). If the WTRU does not receive an RAR for the transmitted preamble (e.g., which may correspond to a certain preamble index and/or time/frequency resource), within an allotted time (e.g., ra-ResponseWindowSize), the WTRU may send another preamble at a later time, at a higher power, (e.g., higher than the previous preamble transmission by powerRampingStep) where the transmission power may be limited by a maximum power, for example a WTRU configured maximum power that may be for the WTRU as a whole (e.g., PCMAX) or for a certain serving cell of the WTRU (e.g., PCMAX,c). The WTRU may wait again for receipt of an RAR from the eNB. This sequence of transmitting and waiting may continue until the eNB may respond with an RAR or until the maximum number of random access preamble transmissions (e.g., preambleTransMax) may have been reached. The eNB may transmit and the WTRU may receive the RAR in response to a single preamble transmission.

A random access procedure may be contention-based or contention-free. A contention-free procedure may be initiated by a request, for example from an eNB. The request may be received via physical layer signaling such as a PDCCH order or by higher layer signaling such as an RRC reconfiguration message (e.g., an RRC connection reconfiguration message) which may include mobility control information and may, for example, indicate or correspond to a handover request. For a contention-free procedure that is initiated by a PDCCH order in a subframe n, the PRACH preamble may be transmitted in the first subframe, or the first subframe available for PRACH, n+k2 where k2 may be greater than or equal to 6 (i.e., k2>=6). When initiated by an RRC command, there may be other delays which may be specified (e.g., there may be a minimum and/or maximum required or allowed delays). The WTRU may autonomously initiate a contention-based procedure for reasons that include initial access, restoration of UL synchronization, and/or recovering from radio link failure, as examples. For certain events, such as events other than recovery from radio link failure, how long after such an event the WTRU may send the PRACH preamble may not be defined or specified.

For a contention-free random access (RA) procedure, a network-signaled PRACH preamble may be used, for example, by a WTRU. For a contention-based random access procedure, the WTRU may autonomously choose a preamble where the preamble format and/or the time/frequency resource(s) available for preamble transmissions may be based on an indication or index (e.g., PRACH configuration Index) which may be provided or signaled by the eNB.

One of the preambles transmitted at the progressively higher transmit powers may be detected by the eNB. An RAR may be sent by the eNB in response to that one detected preamble. A PRACH preamble may be considered a PRACH resource. For example, PRACH resources may include a PRACH preamble, time, and/or frequency resources. The terms RACH resources and PRACH resources may be used interchangeably herein. Also, the terms RA, RACH, and PRACH may be used interchangeably herein.

In some situations of path loss, such as in NR, synchronization signal (SS) blocks (SSBs), RACH resources, control channels (DL/UL) and/or data channel (DL/UL) may collide with each other. In order for a WTRU to perform initial access, channel access, maintain system operation, and/or maximize the system efficiency, rules may be needed to avoid, mitigate or handle these and other situations when collisions occur. Also, in other situations, a WTRU transmission may collide with another WTRU transmission during random access. For example, PRACH preambles may collide with each other, such as where multi-beam systems are used. Enhancement to collision reduction in beam-based systems may be needed to address these and other path loss situations. Furthermore, to support large numbers of beams for beam sweeping, a PRACH preamble format may not be sufficient due to the limited number of symbols. Thus, it may be desirable to have approaches that support large numbers of beams. In one or more embodiments, PRACH resources, DL/UL control, and/or SS/PBCH blocks may be handled to address problematic situations as discussed herein.

Figure 2A:
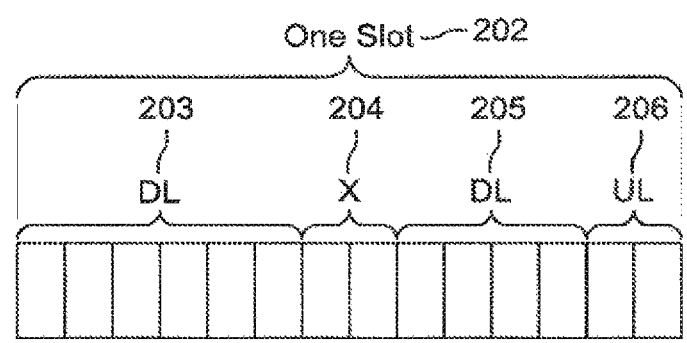
FIG. 2A is a diagram illustrating an example of a RACH/ PRACH transmission.

FIG. 2A illustrates an example of a RACH/PRACH transmission. Generally, a first DL 203 may be a first SS block and second DL 205 may be a second SS block. A slot could have both DL (203 and 205) and UL parts 206. In addition, a flexible or unknown part X 204 could be used in a slot and could be configured as DL or UL. A DL signal/channel 203 may occupy the first $K_1$ OFDM symbols of a slot 202, where K is some non-negative integer. Unknown/flexible part X 204 may occupy $K_2$ OFDM symbols. A second DL signal/channel 205 may occupy $K_3$ OFDM symbols, which may be the same or different as the first DL signal/channel 203 (e.g., DL signal/channel 203 may be a first SS/PBCH block and DL 205 may be a DL signal/channel 205 may be a second SS/PBCH block). UL signal/channel 206 may occupy the last $K_4$ OFDM symbols of the slot 202. An SS block and SS/PBCH block may be interchangeable as discussed herein. The slot 202 may be configured such that each, or some, symbol location may contain a specific type of content; for the example shown in FIG. 2A, DL signal/channel 203, $K_1$ may be the first 4 symbols and the UL signal/channel 206, $K_4$ may be the last 2 symbols. Periodicity may also be configured by a gNB to avoid a collision, however, when/if a PRACH collides with an SS block, some predetermined or predefined rules such as block, signal, and/or channel dropping rules may be used. SS blocks, DL/UL control, and PRACH may have predefined rules when they collide with each other to that the WTRU may implement to handle these issues.

When SS/PBCH blocks and RACH resources collide, a WTRU may take one or more actions to address this issue, such as where a WTRU drops a PRACH and receives an SS block, or the WTRU drops an SS block and transmits a PRACH. The WTRU may also partially transmit a PRACH or partially receive an SS block. These options for collision handling may be based on at least one of the following: actually transmitted SS blocks or maximum SS blocks; latency requirement; service type (e.g., URLLC, eMBB, mMTC, etc.); predefined or predetermined rules (e.g., always transmit SS blocks or always transmit PRACH and drop the other channel); priority of channels, where priority may be predefined or configured; preemption indication; indication received from a gNB regarding which to transmit and which to drop; transmitting partial or all channels when collision occurs using rate matching or puncturing; and/or, a combination of the aforementioned approaches.

If a WTRU receives the actual transmitted SS block indication, the WTRU may use actually transmitted SS block positions to handle the collision. For example, for a long sequence (e.g., a long preamble sequence for PRACH), a WTRU may drop the RACH when there is collision. Otherwise, the WTRU may transmit RACH. For a short sequence (e.g., for a short preamble sequence for PRACH), a WTRU may transmit RACH in a non-slot (e.g., 2 symbols, 4 symbols) where the symbols are not occupied by SS blocks. As discussed herein, a non-slot may be a any non-regular length slot (e.g., a mini-slot). Also, for a short sequence, a WTRU may transmit a partial RACH in a non-slot (e.g., 2 symbols, 4 symbols) where the symbols are partially occupied by SS blocks. An SS block may be an actually transmitted SS block or an SS block may be a candidate SS block location.

If a WTRU does not receive the actual transmitted SS block indication, the WTRU may use a maximum number L of SS block positions to handle the collision. For example, a WTRU may use L=4 SS blocks for below 3 GHz, L=8 SS blocks for below 6 GHz and above 3 GHz, and L=64 for above 6 GHz.

As discussed herein, there may be situations where there is, or could be, a collision between RACH resources, or RACH occasions, and SS block(s). As discussed therein, reference to a RACH occasion may be interchangeable with RACH resource; a RACH occasion may be one or more symbols in a slot where a RACH/PRACH may be sent. The slot, non-slot, or mini-slot with SS blocks may be configured as a RACH occasion according to a RACH configuration table. If collision occurs between a RACH occasion and an SS block, a WTRU may still transmit a PRACH preamble or RACH message 3 by skipping the symbols occupied by the SS block(s). A gNB may perform partial correlation for the PRACH preamble or rate matching for RACH message 3 PUSCH. The number of SS blocks may change. For example, the number of SS blocks may change from 4 to 2. The 2 SS blocks may occupy the first SS block slot. Alternatively, the position of 2 SS blocks may still be the same as when there were 4 SS blocks.

As discussed herein, there may be situations where there is, or could be, a collision of UL Control Channel and RACH Resources. To address such a situation, a WTRU may drop a PRACH and transmit a UL control channel. Alternatively/additionally, a WTRU may drop UL control channel and transmit PRACH. Alternatively/additionally, a WTRU may partially transmit PRACH or partially transmit UL control. Collision handling for these and similar situations may be based on at least one of the following: UL control channel (e.g., whether it is periodic or aperiodic UL control channel); latency requirement; service type (e.g., URLLC, eMBB, mMTC, etc.); predefined or predetermined rules (e.g., always transmit UL control channel or always transmit PRACH and drop the other channel); priority of channels, where priority may be predefined or configured; preemption indication; indication received from a gNB regarding which to transmit and which to drop; transmitting both or all channels when a collision occurs; and/or, any combination of the aforementioned approaches.

A gNB may configure PRACH to avoid the collision between UL control channel and PRACH. If the PRACH collides with the uplink control, the WTRU may either drop RACH or drop UL control.

Predefined rules may be used to handle a collision as discussed herein. For example, when a PRACH and an UL control channel collide, a WTRU may drop UL control and only transmit PRACH, or vice versa.

In one or more situations, an indication may be used to handle a collision. A WTRU may receive an indication regarding which element of a collision is to be dropped and which is to be transmitted. For example, a WTRU may be indicated to drop PRACH and transmit UL control channel, or the WTRU may be indicated to drop UL control channel and transmit PRACH.

In one or more situations, an implicit indication may be used to handle a collision. A WTRU may determine which element of a collision is to be dropped and which is to be transmitted based on the service type. For example, if the service provided to a WTRU is URLLC, the WTRU may drop uplink control channel and transmit PRACH, or vice versa.

In one or more cases, a gNB may transmit and receive simultaneously. When the gNB is transmitting the SS block, the gNB may also be receiving using a specific Rx beam, at the same or different carrier. Then the PRACH may be transmitted even though the gNB is transmitting the SS block.

There may be collisions between RACH occasion(s) and semi-static scheduling and/or dynamic slot format indicator(s) (SFI). Downlink and/or uplink signal and/or channel in semi-static DL/UL assignment may not be overwritten to the other direction. DL and/or UL signal and/or channel in dynamic SFI may not be overwritten by WTRU-specific control or data channel. The RACH occasion that could collide with dynamic SFI may be dropped. The RACH occasion that is could collide with semi-static DL/UL assignment may be dropped.

A gNB and a WTRU may derive valid RACH occasion(s) (VRO) based on at least one of the following: a RACH occasion mapping to slots with SS blocks; semi-static DL and UL; Dynamic SFI; and/or, UL and/or DL scheduling. A valid RACH occasion may be an occasion to transmit in a time increment (i.e., one or more symbols of a slot) where it has been predetermined, or determined, that no collision will occur.

In some situations there may be collisions between a DL control channel and a RACH resource. In these situations, a WTRU may drop the PRACH and receive the DL control channel. Additionally/alternatively, a WTRU may drop the DL control channel and transmit the PRACH. Additionally/alternatively, a WTRU may partially transmit the PRACH or partially receive the DL control. Collision handling may be based on at least one of the following: latency requirement; service type (e.g., URLLC, eMBB, mMTC, etc.); predefined or predetermined rules (e.g., always receive DL control channel or always transmit PRACH and drop the other channel); priority of channels, where priority may be predefined or configured; preemption indication; indication received from a gNB regarding which to transmit and which to drop; transmitting partially or all channels when a collision occurs; and/or some combination of the aforementioned approaches.

A gNB may configure a PRACH to avoid the collision between a DL control channel and a PRACH. If a PRACH collides with the DL control channel, a WTRU may either drop the PRACH or drop the DL control channel.

Predefined rules may be used to handle a collision. For example, when a PRACH and a DL control channel collides, the WTRU may drop the DL control and only transmit the PRACH, or vice versa.

In one or more cases, an indication may be used to handle a collision. A WTRU may indicate which element in a collision is to be dropped and which is to be transmitted. For example, a WTRU may receive an indication to drop the PRACH and receive the DL control channel, or the WTRU may receive an indication to drop the DL control channel and transmit the PRACH.

In one or more cases, an implicit indication may be used to handle the collision. A WTRU may determine which element in a collision to drop and which to transmit based on the service type. For example, if the service provided by a WTRU is URLLC, the WTRU may drop the DL control channel and transmit the PRACH, or vice versa.

A WTRU may receive an indication regarding whether there is a NR-PDCCH present, search space configured, or control resource set (CORESET) configured that may collide with a RACH resource.

A gNB and a WTRU may determine or derive a valid RACH occasion for a DL control channel based on at least one of the following: semi-static DL and UL; dynamic SFI; and/or, UL and/or DL scheduling.

In one or more situations with collisions, rules and RACH resources may be used to address the collisions. As described herein, a RACH resource, or RACH occasion, may collide with either a DL part or an UL part. A RACH resource, or RACH occasion, may also collide with an unknown part that may be configured as a DL part or an UL part. The DL part may be an SS block, DL control channel, other DL control channel, signal, transmission, or the like. The UL part may be an UL control channel, other UL control channel, signal, transmission, or the like. A WTRU may receive an indication regarding semi-static UL/DL configuration and RACH configuration at the same time. The WTRU may also receive an indication for the semi-static UL/DL configuration before the RACH configuration. If the WTRU receives the indication for semi-static UL/DL configuration either at the same time with RACH configuration or before RACH configuration, and if RACH occasions collide with a DL part, then the RACH occasions that collide with the DL part may not be transmitted, but RACH occasions within the UL part may be transmitted. If a WTRU is indicated for semi-static UL/DL configuration after RACH configuration, and the WTRU is not aware of semi-static UL/DL configuration when RACH occasions are transmitted, then the WTRU may assume that RACH occasions will not collide with the DL part, and therefore the RACH occasions may be used for transmission and are valid. A RACH resource, or RACH occasion, may be used or transmitted in an unknown part (i.e., part X) if the unknown part is not configured or if the unknown part is configured as UL for the RACH transmission.

To avoid a possible collision, a WTRU may check a DL/UL configuration. The WTRU may transmit RACH in an UL part. The WTRU may transmit a RACH in a DL part if the DL part is not used. An indication regarding whether the DL part is used or not may be received at the WTRU. If a DL part is indicated as "used" (e.g., used for an SS block which was indicated as an actually transmitted SS block), the WTRU may not transmit RACH in those DL parts. Alternatively or additionally, a WTRU may not transmit a RACH in any DL part, whether it is used or not. Such an alternative or different alternatives may be configured.

In an embodiment, a WTRU may decide where to and/or whether to transmit a RACH resource depending on the location of an SS block or SS block transmission. For example, if the WTRU knows from an indication that an SS block is transmitted in a specific location (e.g., the specific location of a slot, subframe, or the like), then one or more RACH occasions (e.g., some or all of the RACH occasions) may be transmitted or not transmitted. Additionally/alternatively, for a given increment, a RACH may not be transmitted before an SS block but the RACH may be transmitted after the SS block. There may not be a RACH occasion, or RACH resource, before the SS block and the RACH occasion, or RACH resource, may be after the SS block. Additionally/alternatively, if an SS block is located or transmitted in the earlier part of a slot, then a RACH occasion/resource in the later part of a slot may be transmitted, and a RACH before the SS block may not be transmitted. If the SS block is located or transmitted in the later part of a slot, then the RACH in the earlier part of a slot may not be transmitted.

A WTRU may not transmit a RACH that will or may collide with an SS block in a slot, but the WTRU may still transmit the RACH that does not or will not collide with the SS block in the slot. Alternatively/additionally, the WTRU may not transmit all of the RACH occasions in a slot if one or more RACH occasions in a slot may collide with the SS block. The WTRU may transmit RACH or use a RACH occasion based on the collision condition with the SS block. Additionally/alternatively, the WTRU may transmit or not transmit the RACH, or use or not use the RACH occasion based on the location (e.g., in time or frequency) where the SS block is configured, indicated, or scheduled to be transmitted. In one case, a RACH occasion in a certain time, or frequency, location may be used even when it collides with an SS block. In another case, a RACH occasion in a certain time, or frequency, location may not be used if it collides with an SS block.

An indication of semi-static UL/DL configuration may be in New Radio-Physical Broadcast Channel (NR-PBCH), remaining minimum system information (RMSI), other system information (OSI), paging or the like. In addition, if a WTRU is indicated for dynamic UL/DL configuration, then dynamic UL/DL configuration may override the semi-static UL/DL configuration. If dynamic UL/DL configuration is indicated at the same time with RACH configuration or before RACH configuration and dynamic UL/DL configuration overrides the semi-static UL/DL configuration, the WTRU may follow the DL part and UL part in dynamic UL/DL configuration. The WTRU may then follow the rules for a RACH occasion transmission as described herein.

Figure 2B:
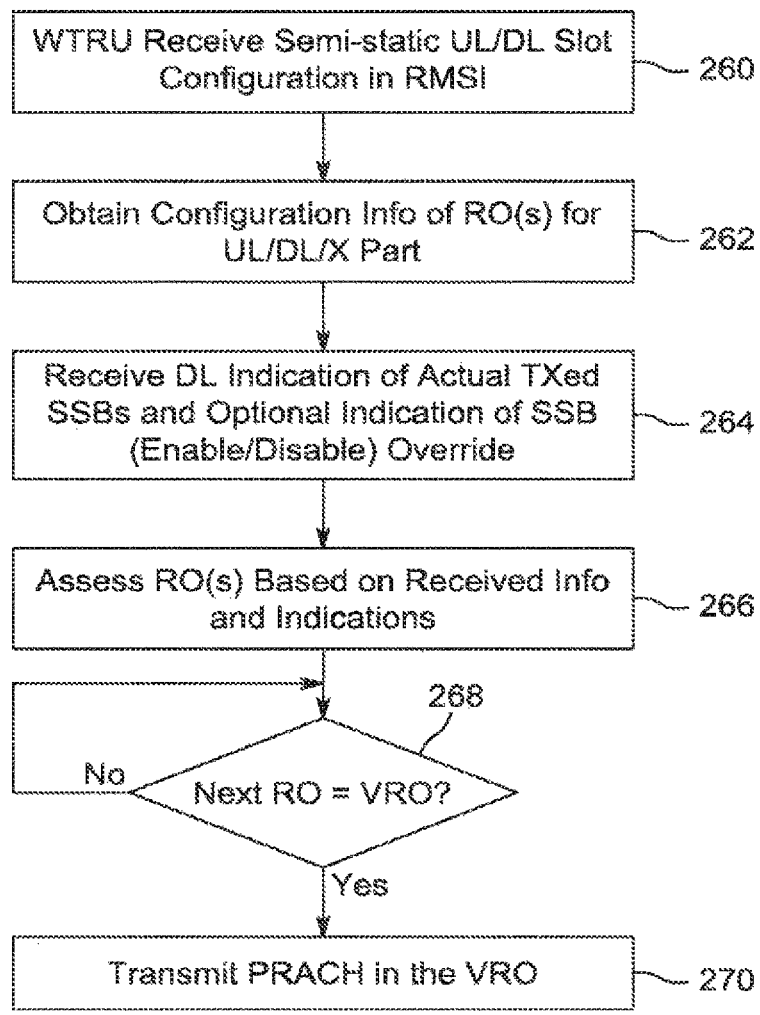
FIG. 2B is a flow chart illustrating an example process for a RACH transmission without SS block collision based on one or more embodiments described herein.

FIG. 2B illustrates an example process for a RACH transmission without SS block collision based on one or more embodiments described herein. At 260, a WTRU may receive semi-static UL/DL Slot Configuration, such as in RMSI. In 262, the WTRU may determine the ROs for the different parts of the slot (i.e., DUX/DL/UL) based on the configuration information. In 264 the WTRU may receive a DL indication of the actually transmitted (Txed) SS blocks. In some cases, the WTRU may also receive an indication of an SS block enable/disable override, which may allow/disallow the WTRU to have a RO in a location where an SS block was indicated. Based on some or all or some of the information received, at 266 the WTRU may assess whether a given symbol is an occasion where a RACH may be sent (i.e., RO). In 268, the WTRU may evaluate the ROs of the slot and determine whether they are valid ROs where there is no expected collision and any rules or indications are considered such that a RACH may actually be sent/scheduled. At 270, the WTRU may transmit the RACH in the valid RO as determined in the previously.

Figure 2C:
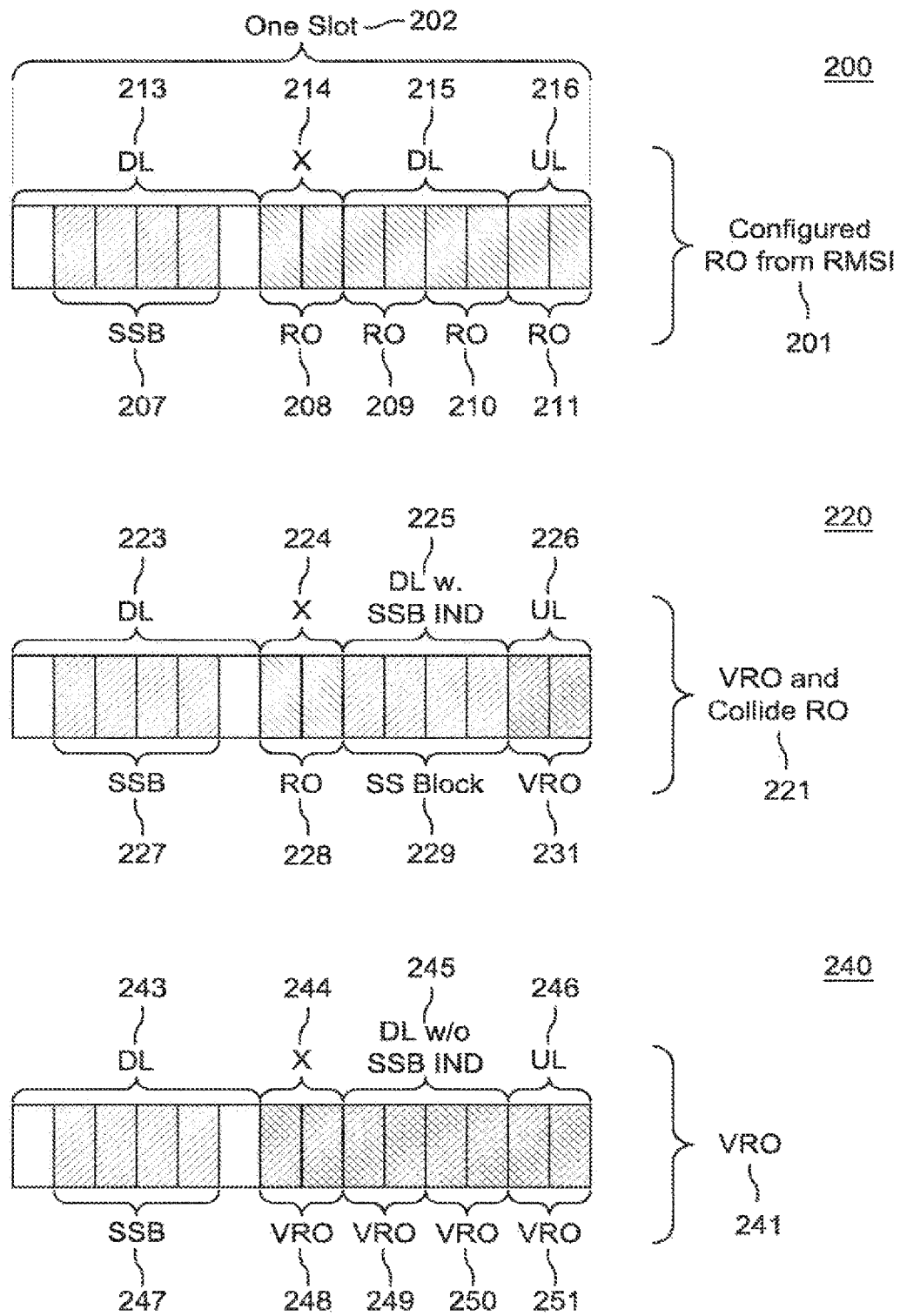
FIG. 2C is a diagram illustrating an example of a PRACH transmission without SS block collision based on one or more embodiments described herein.

FIG. 2C illustrates an example of a PRACH transmission without SS block collision based on one or more embodiments described herein. Each diagram (200, 220, 240) may be the result of one or more stages, in any order, of the process as described in FIG. 2B, as well as any of the rules or conditions for dealing with collisions as described herein. For this example, if there is an SS block in the DL control part, then the WTRU may not transmit a RACH in any of these symbols. Also, a RO may be valid if the occasion is after an indicated SS block, but not before. Generally, the transmission examples show only one slot broken up into parts with varying number of symbols (i.e., OFDM) that may be allocated to DL 213, X 214, DL 215, and UL 216. Each symbol may have a particular shading that corresponds to what occupies or is indicated to occupy that resource; for example, each possible RO has lines that go from top left to bottom right, such as RO 208. No shading may mean that there is no, or no planned, use for that resource.

In diagram 200, a WTRU may have completed 260, 262, and 264. The WTRU may have determined that an SS block (SS block) 207 occupies a portion of the DL control 213 part of the slot 202, therefore, the DL control part 213 may not contain any RO. Further, the remainder of the slot may have several ROs (208, 209, 210, 211) configured, such as by the RMSI. Not shown, there may be a table for ROs. An index pointing to an entry of the table may indicate the ROs. A WTRU may be indicated by the index in an RMSI and determine the ROs based on the index received and the table which is known to WTRU.

Diagram 220 shows process 266, the assessment of whether a RO is a valid opportunity to transmit (i.e., VRO), and may be similar to diagram 200, except that an SS block 229 may be indicated to the WTRU, which results in only the UL part 226 having a valid RO since the X part 224, which was a potential RO, cannot be valid since for this example a WTRU may only have valid ROs after an indicated SS block.

Diagram 240 shows process 266, and may be similar to diagram 200, except that there may be no SS block indicated for the DL 245, which may lead to every RO after the DL control part 243 to be a valid RO.

In one or more embodiments, overlapped preamble subsets may be used. An SS block index may be embedded in an RA-RNTI. The RA-RNTI may be a function of an SS block index. Alternatively or additionally, an SS block index may be included in a random access response (RAR). Furthermore, an SS block index for the overlapped preambles may be embedded in the RA-RNTI and included in the RAR. For example, an SS block index (e.g., for the overlapped preambles) may be embedded in the RA-RNTI (e.g., using different RNTI for different SS block index, or using different CRC masking for different SS block index), and at the same time the same SS block index (e.g., for the overlapped preambles) may be included in an RAR.

Figure 3:
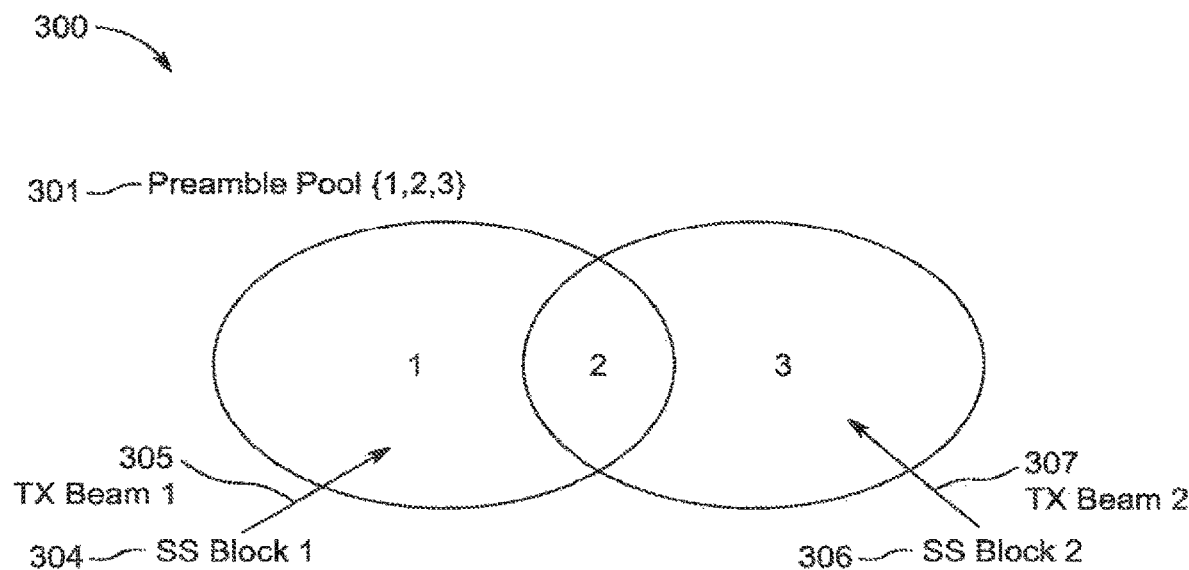
FIG. 3 is a diagram illustrating an example overlapping of preamble and synchronization signal (SS) block.

FIG. 3 illustrates an example overlapping of preamble and synchronization signal (SS) block according to one or more embodiments described herein. In some situations, the association between SS blocks and RACH resources may overlap. That is, multiple SS blocks may be associated with the same RACH resource and/or PRACH preamble, or one SS block may be associated with multiple RACH resources and/or PRACH preamble. An SS block index for the overlapped preambles may be embedded in the RA-RNTI. The RA-RNTI may be a function of an SS block index. Alternatively or additionally, an SS block index for the overlapped preambles may be included in a random access response (RAR). By doing so, collisions among WTRUs as a result of overlapping may be avoided. Furthermore, the SS block index for the overlapped preambles may be embedded in the RA-RNTI and included in the RAR. A WTRU may acquire the SS block index obtained in the RA-RNTI and the SS block index obtained in the RAR. A WTRU may compare the SS block index obtained in the RAR, to the SS block index obtained in the RA-RNTI, and determine the final SS block index.

For a case with gNB Rx/Tx beam correspondence, preamble subsets corresponding to different SS blocks in one RACH slot may be overlapped to increase the capacity of initial access and random access.

For a case without gNB Rx/Tx correspondence, if preamble subsets corresponding to different SS blocks in one RACH slot are overlapped, multiple WTRUs with different SS blocks sending the same overlapped preamble may collide, because the gNB may not correctly separate the TAs associated to different SS blocks.

For a case with gNB Rx/Tx correspondence and overlap between gNB Tx beams, if preamble subsets corresponding to different SS blocks in one RACH slot are overlapped, multiple WTRUs with different SS blocks sending the same overlapped preamble may be separated by the gNB sending an SS block index inside the RARs, which may avoid collision among those WTRUs.

For a case with gNB Rx/Tx correspondence and no overlap between gNB Tx/Rx beams, if preamble subsets corresponding to different SS blocks in one RACH slot are overlapped, multiple WTRUs with different SS blocks sending the same overlapped preamble may be geographically separated by the gNB Rx/Tx beams, and gNB may not need to send an SS block index inside the RARs.

A gNB may configure whether to include SS block index in RAR, or RA-RNTI, based on antenna configuration, beam configuration, and/or beam correspondence.

As shown in FIG. 3, there may be a set, or a pool, of PRACH preambles 301, {1, 2, 3}, that may be partitioned into one or multiple subsets called preamble subsets. An SS block, such as a 304 SS block 1 or a 306 SS block 2, may be associated with one or more preamble subsets. Preamble subsets may or may not overlap with one another. Preamble subsets may or may not share the same preamble(s). In one instance, a RACH configuration may allow that within one RACH Occasion (RO), preambles 1 and 2 may be associated with or mapped to the 304 SS block 1 creating a subset of {1, 2} and preambles 2 and 3 may be associated with or mapped to the 306 SS block 2 creating the subset {2, 3}. The first preamble subset {1, 2} may be associated with or mapped to the 304 SS block 1 while the second preamble subset {2, 3} may be associated with or mapped to the 306 SS block 2. Just as in this example, preamble subsets may overlap with each other. Preamble 2 may be shared by the 304 SS block 2 and 306 SS block 2.

At a gNB, the 305 Tx beam 1 may be associated with 304 SS block 1, and the 307 Tx beam 2 may be associated with 306 SS block 2.

In a case 1, the 305 Tx beam 1 and 307 Tx beam 2 may overlap, which means that a WTRU may receive both of the signals from 305 Tx beam 1 and 307 Tx beam 2. In a case 2, the 305 Tx beam 1 and 307 Tx beam 2 do not overlap, which means that a WTRU may only receive the signal from either Tx beam 1 or Tx beam 2 but not both. Given these case 1 and case 2, the following four scenarios may be considered: scenario 1, case 1—without gNB Tx/Rx beam correspondence; scenario 2, case 2—without gNB Tx/Rx beam correspondence; scenario 3, case 1—with gNB Tx/Rx beam correspondence; and scenario 4, case 2—with gNB Tx/Rx beam correspondence.

In an embodiment, a WTRU A may measure SS blocks and select 304 SS block 1, and may randomly choose a preamble in the preamble subset associated with the 304 SS block 1. A WTRU may select preamble 2. The WTRU B may measure the SS blocks and select 306 SS block 2, and may randomly choose a preamble. The WTRU B may also choose the preamble 2.

A gNB may receive a single preamble (i.e., preamble 2) from both WTRUs (WTRU A and WTRU B). When the gNB receives the preamble 2, the gNB may determine that SS blocks (304 SS block 1 and 306 SS block 2) are associated with the detected preamble (preamble 2). The gNB may send two RARs, RAR1 in 305 Tx beam 1 and RAR2 in 307 Tx beam 2. The RAR1 may carry an SS block index 1 with RA-RNTI, and RAR2 may carry an SS block index 2 with the same RA-RNTI. Both WTRUs may decode the same RA-RNTI and decode the RAR accordingly. The WTRU A may obtain the SS block index in RAR1 (sent in 305 Tx beam 1) and the WTRU B may obtain the SS block index in RAR2 (sent in 307 Tx beam 2), and each WTRU may compare the received SS block index and its own selected SS block (WTRU A for 304 SS block 1 and WTRU B for 306 SS block 2). If they match, each WTRU may assume that the RAR is intended for itself and send the Message 3 based on the grant received in its own RAR. Otherwise each WTRU may discard the received RAR. If both WTRU A and WTRU B select 304 SS block 1 (or 306 SS block 2), WTRUs A and B may obtain the SS block index in RAR1 (or RAR2) and collision may occur. A redundancy version preamble method may be used to reduce or eliminate potential collision.

When a gNB has Tx/Rx beam correspondence, timing advance (TA) may be included in the RAR for beam transmitting a RAR. SS block specific TA and/or beam specific TA may be used in such a situation. Since the gNB may receive preambles from different Rx beams for different SS blocks, the gNB may estimate the TA for each Rx beam even though the same preamble is sent by both WTRUs. In RAR1, TA1 for WTRU A may be included in RAR1 sent in 305 Tx beam 1 associated with 304 SS block 1. TA2 for WTRU B may also be included in RAR2 sent in 307 Tx beam 2 associated with 306 SS block 2.

In some situations a gNB may have no Tx/Rx beam correspondence. For example, WTRU A's preamble 2 and WTRU B's preamble 2 may or may not be received from the same Rx beam. If they are received from the same Rx beam, then the gNB may not be able to tell that it is the same preamble but sent by two different WTRUs. If they are from different Rx beams, then the gNB knows that this preamble is sent from two different WTRUs in two different Rx beams and the TA corresponding to two WTRUs may be estimated. The gNB may not know which TA is for 304 SS block 1 and which is for 306 SS block 2, because there is no Tx/Rx correspondence. Therefore, the TA may be a function of beam correspondence.

For scenario 3 with Tx/Rx correspondence, a gNB may know the TA of preamble 2 for 304 SS block 1 and it may be included in RAR 1. The gNB may also know that the TA of preamble 2 and it may be included in RAR 2.

For scenarios 1 or 2, the TA may not be estimated correctly for the WTRUs in an example.

For scenario 3, the TA may be estimated correctly. The WTRU A may receive RAR1 through CORESET with RA-RNTI, and check that the preamble index (preamble 2) and SS block index (304 SS block 1) are for itself. Similarly, the WTRU B may receive RAR2 through CORESET with RA-RNTI, and check that the preamble index (preamble 2) and the SS block index (SS block 2) are for itself.

For scenarios 1 or 3, the WTRU A may also receive RAR 2, however the SS block index (306 SS block 2) in the RAR2 may not match with what it selects an for SS block (304 SS block 1), and thus WTRU A may discard RAR2. Similarly, the WTRU B may also receive RAR1, however the SS block index (304 SS block 1) in the RAR1 may not match with what it selects for SS block (306 SS block 2), and thus the WTRU B may discard RAR1.

For scenario 4, the WTRU A may only receive the RAR for its own and the WTRU B may only receive the RAR for its own. A gNB may not need to include the SS block index in RARs.

A gNB may be configured to include an SS block index in RAR or not to include the SS block index in the RAR. Furthermore, a gNB may be configured to include, or embed, SS block indexes in RAR and/or RA-RNTI. A gNB may be configured not to include, or embed, SS block indexes in any of the RAR and RA-RNTI. The configuration for the SS block index inclusion in RAR and/or RA-RNTI may be indicated in NR-PBCH, RMSI, OSI, paging, or the like.

A WTRU may receive a beam correspondence (BC) indication from a gNB regarding the gNB's BC. If the BC indication indicates "BC" and PRACH preamble subset overlap is configured, the WTRU may assume that an SS block index is present in the RAR or RA-RNTI. Otherwise, the WTRU may assume that an SS block index is not present in RAR or RA-RNTI. A flag or 1-bit indicator may be used to indicate the presence/absence of the SS block index in RAR, NR-PBCH, remaining minimum system information (RMSI), or the like.

For the RACH configuration of scenario 3, a WTRU may select 304 SS block 1 and send preamble 2; a gNB may receive preamble 2 with Rx beam 1 and estimate the TA accordingly. Due to beam correspondence, the TA may be known for 304 SS block 1. The gNB may send the RAR with RA-RNTI and RAR with random access preamble ID (RAPID) for preamble 2 corresponding to 304 SS block 1 as well as the corresponding TA and RACH Msg3 grant. The WTRU may receive RAR successfully and obtain the RACH Msg3 grant.

In an embodiment, WTRU A may select 304 SS block 1 and send preamble 2. At the same time, WTRU B may select 306 SS block 2 and send preamble 2. A gNB may receive preamble 2 with Rx beam 1, and estimate TA1; the gNB may receive preamble 2 with Rx beam 2, and obtain TA2. According to the beam correspondence, TA1 may be for 304 SS block 1, and TA2 may be for 306 SS block 2. A gNB may send RAR1 in gNB 305 Tx beam 1, with RA-RNTI with information for preamble 2, 304 SS block 1, TA1, and Msg3 grant. The gNB may also send RAR2 in gNB 307 Tx beam 2, with RA-RNTI with information for preamble 2, 304 SS block 2, TA2, and another Msg3 grant. The WTRU A may receive RAR1 since the SS block index in RAR1 is intended for the WTRU A. The WTRU B may receive RAR2 since the SS block index in RAR2 is intended for WTRU B.

In an embodiment for three WTRUs (not shown), WTRUs A, B, and C may send preamble 2 at the same time. The WTRUs A and C may select SS block 1, and the WTRU B may select SS block 2. A gNB may receive preambles by both Rx beams 1 and 2, and may send RAR1 and RAR2, respectively. The WTRU A and WTRU C may receive RAR1 because the SS block index in RAR1 is 1, and, both WTRUs may send a RACH Msg3 using the same UL grant and applying TA1. The WTRU B may receive RAR2 and send a RACH Msg3 by applying TA2. The RACH Msg3 of the WTRU A and WTRU C may collide with each other and the gNB may successfully receive only one RACH Msg3 from one of the WTRUs whose TA is correct, and may fail decoding the other RACH Msg3 (i.e., the gNB may fail to receive both RACH Msg3).

In one or more embodiments, a preamble type may be based on a hierarchical association of an SS Block and RACH. An SS block may be associated with a RACH occasion. For example, one SS block may be associated with one RACH occasion. All the preamble indexes for the RACH occasion may be associated with the same SS block. A WTRU may randomly select any one preamble and transmit the selected preamble in the RACH occasion associated with the selected SS block that the WTRU may want to convey to a gNB.

In an alternative, an SS block may be associated with both RACH occasion and preamble. Multiple SS blocks may also be associated with one RACH transmission occasion, and hierarchical association may be used. SS blocks (e.g., actually transmitted SS block) may be divided into groups, for example, K groups, where K is some non-negative integer. The SS block group may be associated with a RACH occasion. Within each RACH occasion, an SS block within the SS block group may be associated with the preamble belonging to the corresponding RACH occasion. An SS block may be associated with a combination of a RACH occasion and a preamble index. The preamble indexes for the RACH occasion may be associated with the SS block. One or more preamble indexes within the RACH occasion may be associated with an SS block. The preamble indexes for each SS block may be mapped consecutively or non-consecutively. For non-consecutive mapping, the preamble indexes for each SS block may be mapped in an interleaved fashion or distributed fashion. A WTRU may select the preamble associated with the selected SS block to be sent to a gNB and transmit the selected preamble in the RACH occasion associated with these multiple SS blocks.

In one or more cases, SS blocks may be actually transmitted SS blocks. Alternatively or additionally, SS blocks may be candidate SS blocks, nominal SS blocks, or all SS blocks including transmitted or not transmitted SS blocks. If a WTRU is indicated for actually transmitted SS blocks, the WTRU may use actually transmitted SS blocks for the association with RACH occasions or resources. If a WTRU is not indicated for actually transmitted SS blocks, the WTRU may use candidate SS blocks, nominal SS blocks, or all SS blocks including transmitted or not transmitted SS blocks for the association with RACH occasions or resources. If a WTRU is indicated or configured to use candidate SS blocks, nominal SS blocks, or all SS blocks to associate with RACH occasions or resources, this may override the case of using actually transmitted SS blocks even if the WTRU may be indicated for actually transmitted SS blocks. For example, such override indication or association configuration may be in RRC signaling or NR-PBCH. The actually transmitted SS blocks may be indicated in RMSI or OSI.

The techniques described herein may be applied to either contention based random access or contention free random access, and/or may also be applied to both contention based random access and contention free random access.

Figure 4:
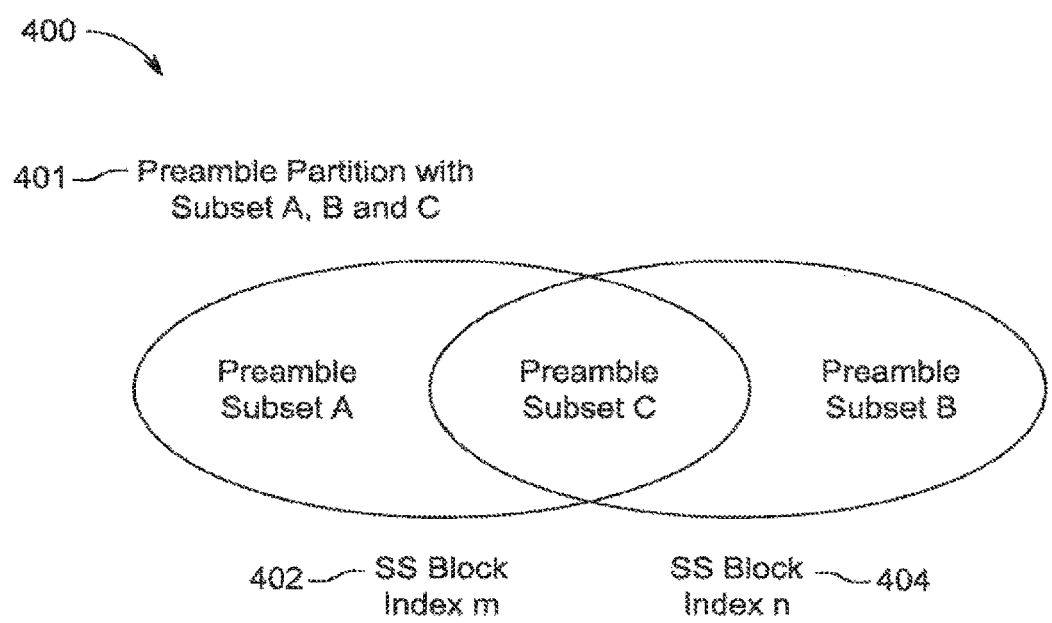
FIG. 4 is a diagram illustrating an example method of preamble and SS block association.

FIG. 4 illustrates an example of preamble and SS block association. As shown, preambles partitioned 401 into multiple subsets A, B, and C with two, or more, types. A first type of preamble subsets may be associated with one SS block. The second type of preamble subsets may be associated with more than one SS block. For example, preamble subsets A and B each may be the first type of preamble subsets which may be associated with one SS block, such as SS block 402 and SS block 404, respectively. A preamble subset C may be the second type of preamble subset which may be associated with more than SS block, such as SS block 402 and 404.

In one case, SS block 402 and SS block 404 may be adjacent to each other in terms of their associated transmitted beams. SS block 402 may have index m and SS block 404 may have index n. In this case, m may be n+1 or n−1.

Figure 5:
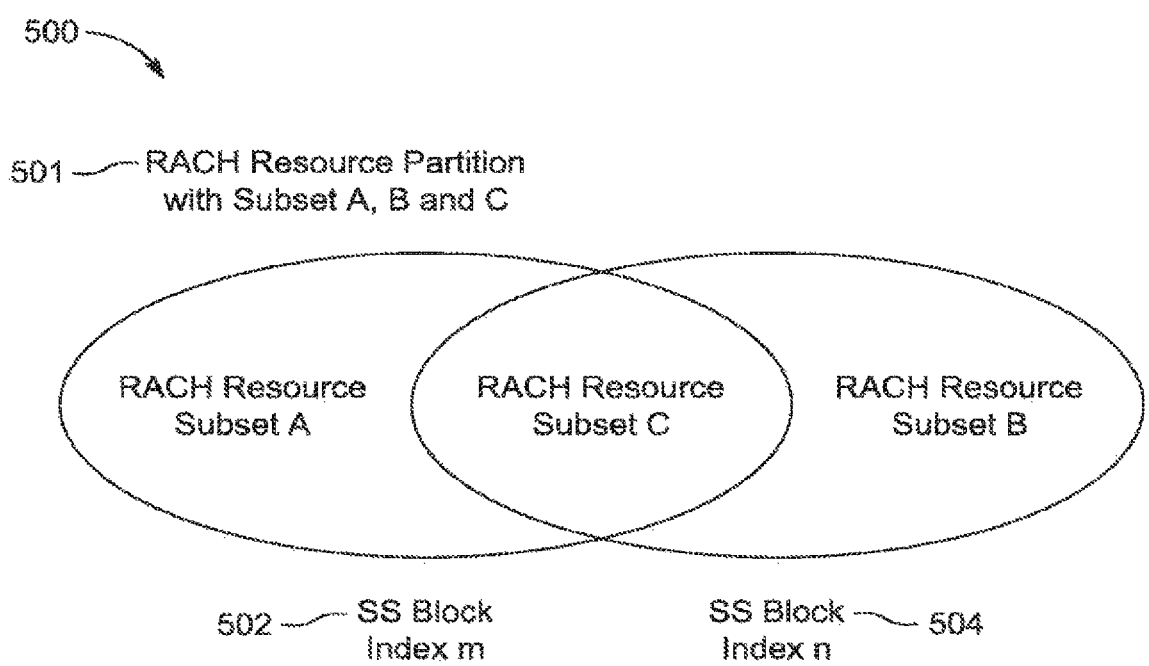
FIG. 5 is a diagram illustrating an example method of RACH occasion (or RACH resource) and SS block association.

FIG. 5 illustrates an example method of RACH resource and SS block association. For purposes of the illustration, RACH Resource and RACH Occasion may be interchangeable when appropriate. As shown, RACH Resources may be partitioned 501 into multiple subsets A, B, and C with two, or more, types. A first type of RACH Resource subsets may be associated with one SS block. The second type of RACH Resource subsets may be associated with more than one SS block. For example, RACH Resource subsets A and B each may be the first type of preamble subsets which may be associated with one SS block, such as SS block 502 and SS block 504, respectively. RACH Resource subset C may be the second type of preamble subset which may be associated with more than one SS block, such as both SS block 503 and SS block 504.

In one case, SS block 502 and SS block 504 may be adjacent to each other in terms of their associated transmitted beams. SS block 402 may have index m and SS block 404 may have index n. In this case, m may be n+1 or n−1.

Figure 6:
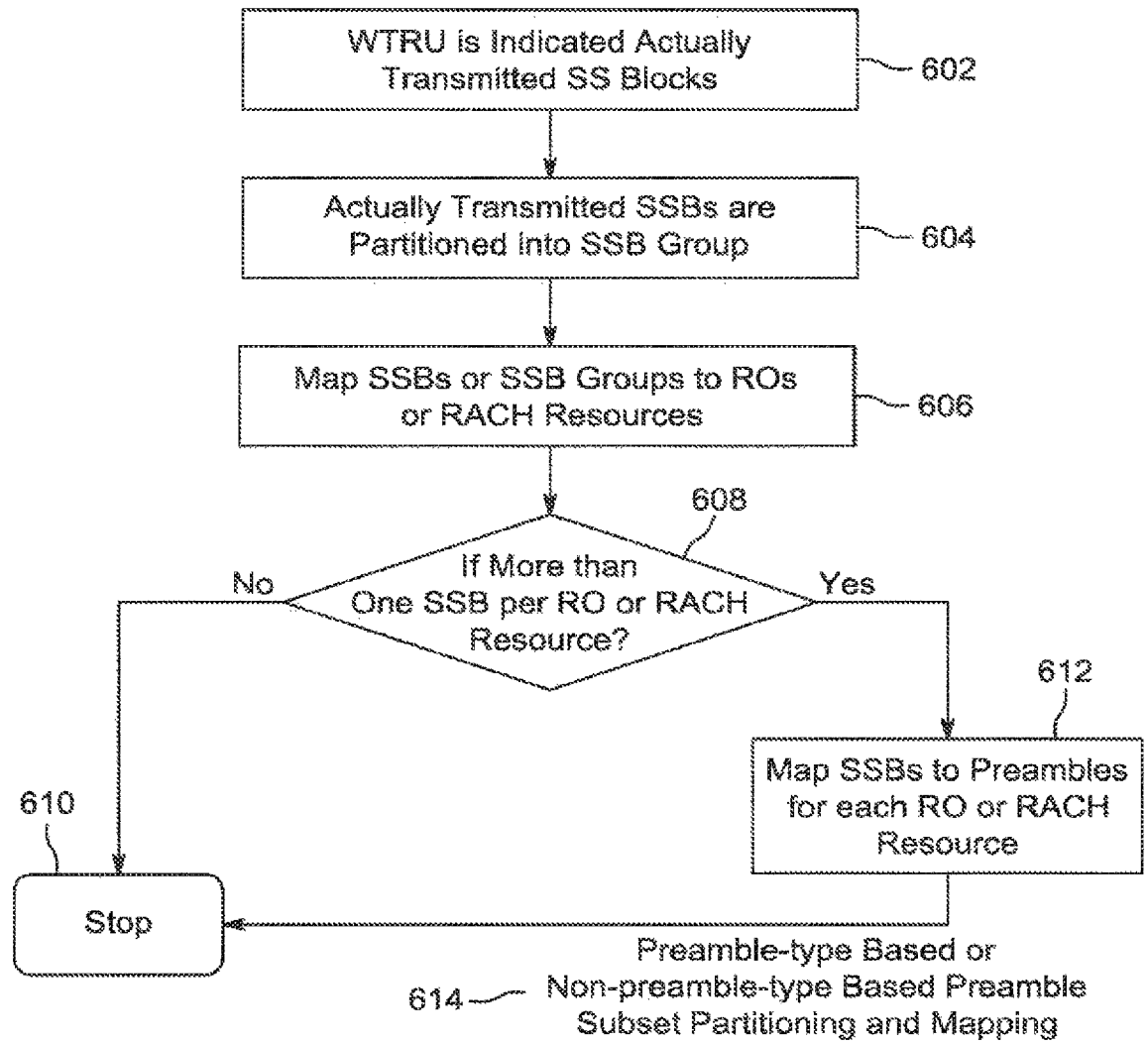
FIG. 6 is a diagram illustrating an example method of SS block association and mapping to RACH.

FIG. 6 illustrates an example process of SS block association and mapping to RACH. The WTRU may carry our one or more of the stages as disclosed. At 602, actually transmitted SS blocks (SS blocks) may be indicated to a WTRU. At 604, the actually transmitted SS blocks may be partitioned into an SS block group. At 606, the SS blocks or SS block groups are mapped to ROs or RACH Resources. At 608, if there is more than one SS block per RO or RACH resource, then the SS blocks may be mapped to preambles for each RO or RACH resource in 612, after which there may be preamble-type based or non-preamble-type based preamble subset partitioning and mapping of 614. If there is not more than one SS block per RO or RACH Resource according to 608, then the process may stop at 610.

Figure 7:
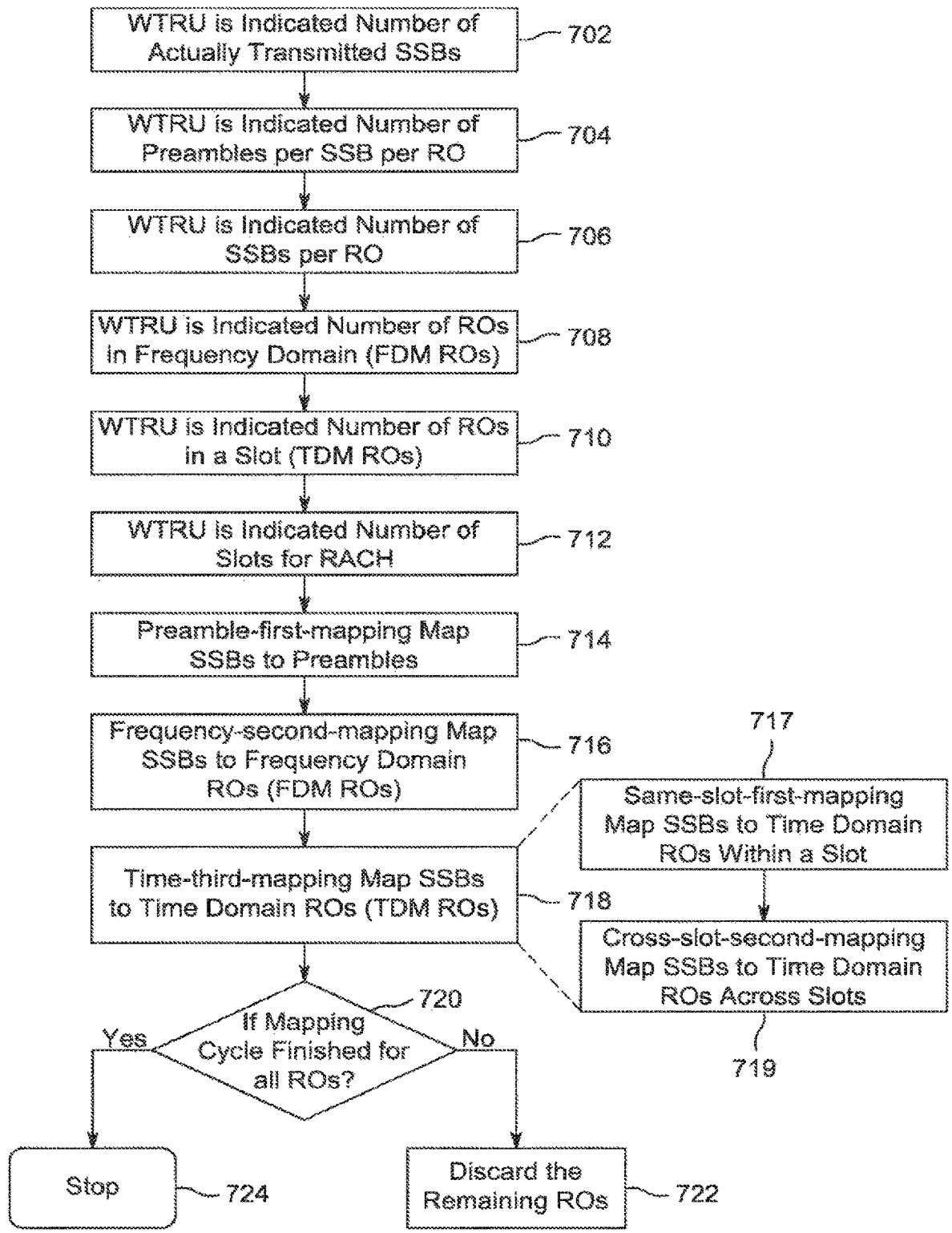
FIG. 7 is a diagram illustrating another example method of SS block association and mapping to RACH.

FIG. 7 is a diagram illustrating another example method of SS block association and mapping to RACH. A WTRU may perform one or more stages of this example. At 702, a number of actually transmitted SS blocks may be indicated to a WTRU. At 704 a number of preambles per SS block per RO may be indicated to a WTRU. At 706, a number of SS blocks per RO may be indicated to a WTRU. At 708, a number of ROs in the Frequency Domain (FDM ROs) may be indicated to a WTRU. At 710, a number of ROs in a slot (TDM ROs) may be indicated to a WTRU. At 712, a number of slots for RACH may be indicated to a WTRU. At 714, there may be a preamble-first-mapping that maps SS blocks to preambles. At 716 there may be frequency-second-mapping that maps SS blocks to Frequency Domain ROs (FDM ROs). At 718 there may be time-third-mapping that maps SS blocks to Time Domain ROs (TDM ROs). At 717, there may be same-slot first-mapping that maps SS blocks to Time Domain ROs within a slot. At 719, there may be cross-slot second-mapping that maps SS blocks to Time Domain ROs across slots. If same-slot mapping is sufficient, the cross-slot mapping may not be needed. If same-slot mapping is not sufficient (e.g., there are many SSBs needed to be mapped to ROs), then cross-slot mapping may be performed. At 720, if mapping cycle is finished for all ROs, then proceed to 724 and stop. Also at 720, if mapping cycle is not finished for ROs, then discard the remaining ROs at 722.

In one or more embodiments, there may be PRACH resource package based beam sweeping. The number of OFDM symbols in a PRACH preamble format or the repetition number of a PRACH preamble format may be smaller than the number of a gNB Rx beam. A gNB may sweep Rx beams for PRACH using multiple RACH occasions. The multiple RACH occasions may consist of one or multiple RACH resources (e.g., one or multiple slots, non-slots, mini-slots or OFDM symbols). The multiple RACH occasions may be consecutive or may not be consecutive. Multiple RACH occasions may be configured to one WTRU. In one case, the WTRU may assume that there may be multiple RACH occasions as a package. The WTRU may start a PRACH preamble transmission using the $1^{st}$ RACH occasion, $2^{nd}$ RACH occasion, $3^{rd}$ RACH occasion, and so on, until all the beams have been swept. Depending on the number of actually transmitted SS blocks, or number of beams at a gNB, multiple RACH occasions (as a package) with K OFDM symbols may be configured to the WTRU for K actually transmitted SS blocks or beams at the gNB. To further support WTRU Tx beam sweeping in addition to gNB Rx beam sweeping, if the WTRU has M Tx beams, then multiple RACH occasions (as a package) with K times M OFDM symbols may be configured to the WTRU. Different PRACH preamble formats may be used, such as preamble format A, B and/or C. For example, PRACH preamble format A may be A0, A1, A2, A3, preamble format B may be B1, B2, B3 and B4. Preamble format C may be C0 and C1. The number of SS blocks may be notated as L. The number of gNB Rx beams may be notated as $N_{rx}$. The repetition number of configured preamble format may be notated as $N_{rp}$.

If there is no beam correspondence, in order to ensure that a gNB can sweep all Rx beams to receive multiple RACH trials from a WTRU, the gNB may configure ceiling $$\left\{ \frac{N_{rx}}{N_{rp}} \right\}$$

types of RACH occasions. All gNB Rx beams may be swept by a "RACH occasion package". This may be configured for each SS block or for all SS blocks. Different types of RACH occasions may correspond to different $N_{rp}$ gNB Rx beams. The ceiling $$\left\{ \frac{N_{rx}}{N_{rp}} \right\}$$

types of RACH occasions may be defined as a "RACH occasion package".

For a retransmission of RACH Msg1, the WTRU may pick up a different RACH occasion type that has not been used in the previous RACH Msg1 (re)transmissions in order to complete the gNB Rx beam sweeping.

For RACH Msg1 retransmission, it may be configured or determined by the WTRU to decide whether to change WTRU UL Tx beam, ramp up the power, or change the type of RACH occasion.

Figure 8:
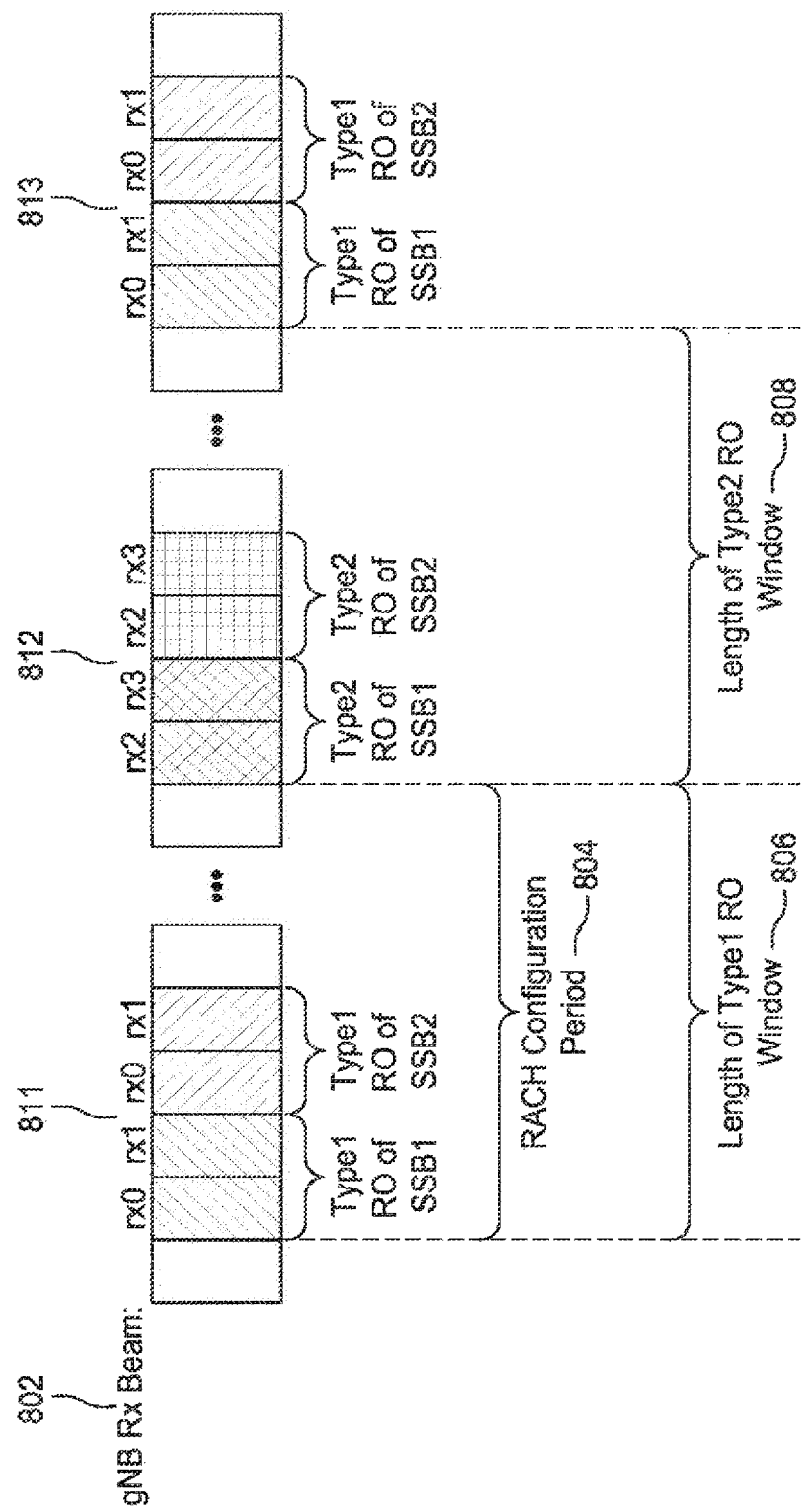
FIG. 8 is a diagram illustrating an example configuration of window length for each random access channel (RACH) occasion type where the window length of a RACH occasion type is the same as the RACH configuration period.

FIG. 8 illustrates an example configuration of a window length for each random access channel (RACH) occasion type where the window length, such as 806 and 808, of a RACH occasion may be the same as the RACH configuration period, such as 804. The window length for each RACH occasion type may be configured such that the window lengths of all RACH occasion types are the same. For example, the window length 806 may be the same as the RACH Configuration period 804. Alternatively or additionally, the window lengths of all RACH occasion types may be N times a RACH configuration period (not shown), where N may be configured in the remaining minimum system information (RMSI). In one example, N may be an integer greater than 1.

Figure 9:
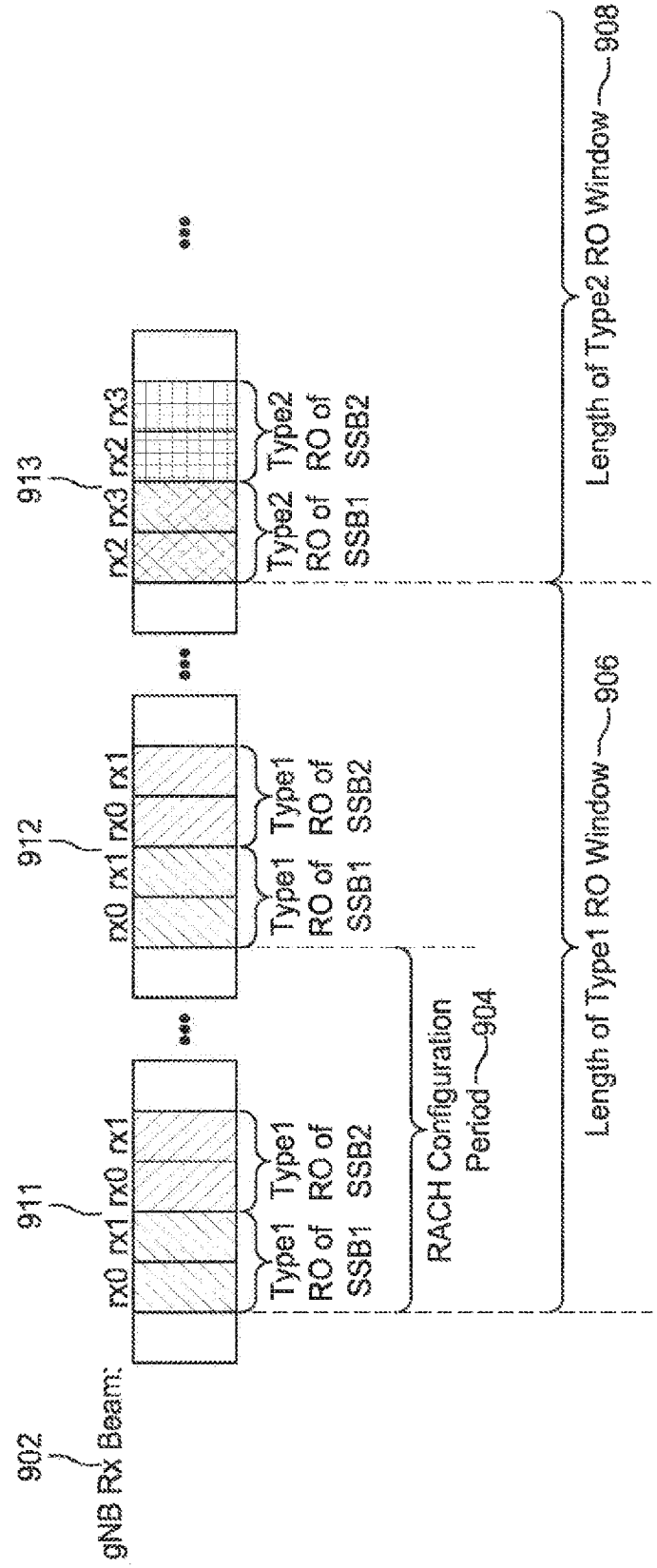
FIG. 9 is a diagram illustrating an example configuration of window length for each random access channel (RACH) occasion type where the window length of a RACH occasion type is twice of the RACH configuration period.

FIG. 9 illustrates an example configuration of a window length for each random access channel (RACH) occasion type where the window length of a RACH occasion is twice of the RACH configuration period. As shown, the window length 906 for a RACH occasion type is configured to be twice the RACH Configuration period 904.

Figure 10:
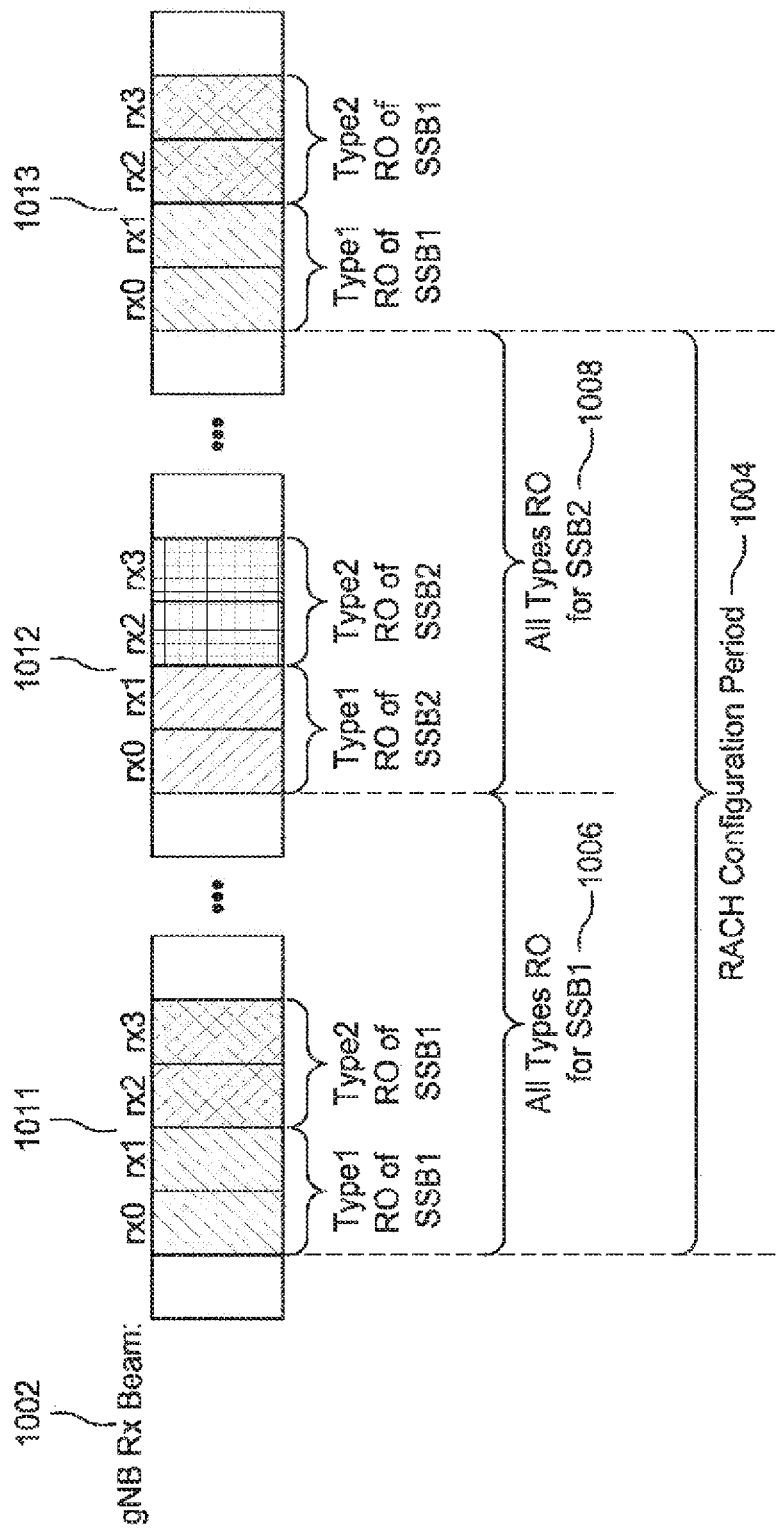
FIG. 10 is a diagram illustrating an example configuration of window length for each random access channel (RACH) occasion type where the window length of a RACH occasion type is smaller than the RACH configuration period.

FIG. 10 illustrates an example configuration of window length for each random access channel (RACH) occasion type where the window length of a RACH occasion is smaller than the RACH configuration period. As shown, the window length 1006 for each RACH occasion type may be smaller than a RACH configuration period 1004. All RACH occasion types may be within a RACH configuration period. In some embodiments, window lengths of different RACH occasion types may be different. Predefined patterns of window lengths may be used. A WTRU may be configured with one pattern in an RMSI.

The number of RACH occasion types, Q, may be indicated to a WTRU in NR-PBCH or RMSI. Depending on beam correspondence, Q may have different values. For example, for a gNB without beam correspondence, $$Y = \text{ceiling}\left\{ \frac{N_{rx}}{N_{rp}} \right\}.$$

For a gNB with beam correspondence, Y=1. For a gNB with partial beam correspondence, $$Y = \text{ceiling}\left\{ \frac{N_{rx}^{ss}}{N_{rp}} \right\},$$

where $N_{rx}^{ss}$ is the number of gNB Rx beams that have overlap with the gNB Tx beam corresponding to the SS block. For example, $N_{rx}$=4; $N_{rp}$=2; L=4. There may be two types of RACH occasion for each SS block. The type 1 RACH occasion may be received by gNB Rx beams 0 and 1. The type 2 RACH occasion may be received by gNB Rx beams 2 and 3.

In an embodiment, $N_{rx}$ may be set to 64, $N_{rp}$ may be set to 12, and L may be set to 64 (i.e. $N_{rx}$=64; $N_{rp}$=12; L=64). There may be 6 types of RACH occasions for each SS block. Each type of RACH occasions may be received by 12 gNB Rx beams, and the subset of gNB Rx beams may be different for different types of RACH occasions.

In another embodiment, $N_{rx}$ may be set to 2 and N rp may be set to 2 (i.e. $N_{rx}$=2; $N_{rp}$=2). There may be only one type of RACH occasion in this embodiment.

Figure 11:
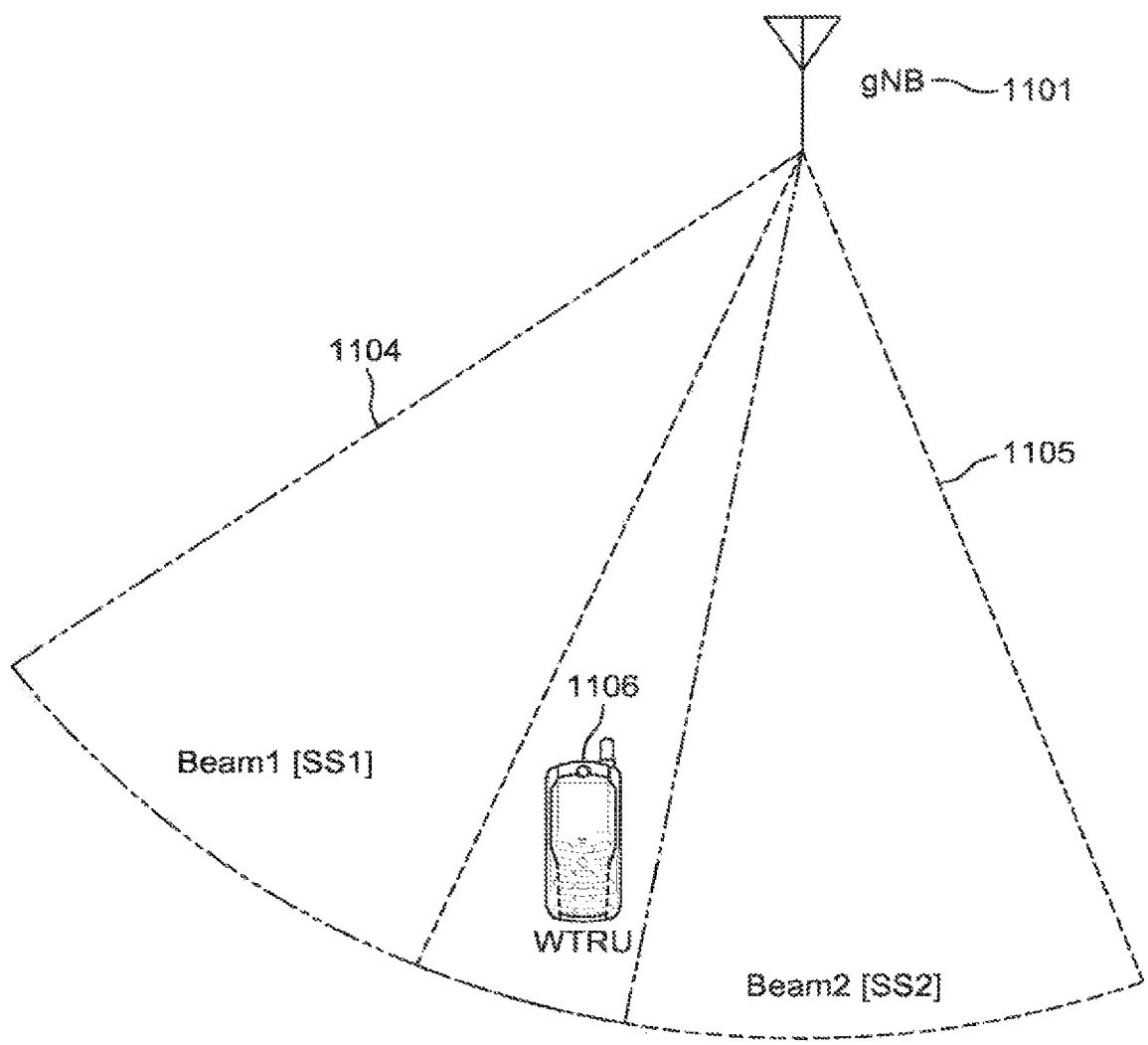
FIG. 11 is a diagram illustrating an example redundancy version of preamble based on SS beam reporting.

FIG. 11 illustrates an example redundancy version of a preamble based on SS beam reporting. A WTRU 1106 may perform listen before talk (LBT) and transmit a RACH preamble. A gNB 1101 may perform the LBT and transmit RAR. If the gNB 1101 fails LBT in 1104 beam 1, it may not transmit RAR in 1104 beam 1. If the WTRU 1106 reports only one beam (e.g., 1104 beam 1), the WTRU 1106 may not receive RAR due to the LBT failure of the gNB 1101.

In an embodiment, a WTRU 1106 may report more than one beam (especially at overlap area of beams) such as 1104 beam 1 and 1105 beam 2. The WTRU 1106 may report the SS block for the strongest beam along with SS block for other beams. The WTRU 1106 may perform LBT and transmit a RACH preamble which may associate with SS block #1 (e.g., 1104 beam 1) and SS block #2 (e.g., 1106 beam 2). A gNB 1101 may perform LBT on more than one beam (e.g., 1104 beams 1 & 1106 beam 2) and may transmit RAR accordingly. If the gNB 1101 fails LBT in 1104 beam 1, it may transmit RAR in other beams (e.g., 1106 beam 2). On the other hand, if the gNB 1101 fails LBT in 1106 beam 2, it may transmit RAR in other beams (e.g., 1104 beam 1). Unless the gNB 1101 fails LBT in both or all beams, the gNB 1101 may need to continue performing LBT until the channel is clear before transmitting RAR. This may cause significant delay and high latency. By reporting more than one SS block from the WTRU 1106, the gNB 1101 may be able to transmit RAR with no delay. Association of preamble and SS block may be one preamble to many SS blocks. For example, preamble #1 may be associated with SS block #1 and #2, preamble #2 may be associated with SS block #3 and #4, and so on.

However, when more than one WTRUs are in the same overlapped area of beams, multiple WTRUs may report the same preamble which results in collision (not shown). In NR or NR-Unlicensed, WTRUs in the same overlapped area of beams may report the same preamble which may result in a preamble collision if a WTRU selects the same RACH occasion.

In an embodiment, redundancy version based SS block reporting may be used, and a gNB may be able to transmit RAR with no delay. The association of a preamble and an SS block may be based on redundancy of the preamble.

In an embodiment, a redundancy version of a preamble association may be used, where an association of a preamble and an SS block may be one preamble to many SS blocks and a redundancy version of the same association of the preamble and SS block may be used. For example, in a case where preamble #1 is associated with SS block #1 and #2, the preamble #2 may be a redundancy version of preamble #1 and may also be associated with the same SS blocks (e.g., SS block #1 and #2). This may eliminate or reduce WTRU collision since the WTRUs in the same overlapped area of beams may not report the same preamble.

In one case, a WTRU may report more than one SS block using a preamble or RACH Msg3. Where preamble-based SS block reporting is used, one preamble may be mapped to multiple SS blocks (e.g., preamble #1 is mapped to SS block #1 and SS block #2). In order to further reduce collision, the same mapping may be repeated for another preamble. For example, a redundancy version of preamble #1 may be produced for preamble #3. In another example, redundancy version of preamble #1 may be one or the following: preamble #2, which may be mapped to the same SS blocks (e.g., SS block #1 and SS block #2); or preamble #3, which may be mapped to the same SS blocks (e.g., SS block #1 and SS block #2). A gNB may perform directional a LBT and send RAR. If the LBT fails in SS block 1, the gNB may have flexibility to send RAR in SS block2.

In a case where RACH Msg3-based SS block reporting is used, the RACH Msg 3 may include the redundant version for mapping in its payload as follows: preamble #1 may be mapped to SS block #1 and SS block #2; preamble #2 may be mapped to SS block #1 and SS block #2; and/or, preamble #3 may be mapped to SS block #1 and SS block #2.

A redundancy version of a preamble based SS block reporting may be applied to initial access and channel access including random access, beam management for data, and/or control, mobility, and/or other use cases and scenarios. A redundancy version of a preamble based SS block reporting may be applied to NR licensed band or unlicensed bands as well as standalone or non-standalone systems.

Although the features and elements of the present invention are described in the preferred embodiments in particular combinations, each feature or element can be used alone without the other features and elements of the preferred embodiments or in various combinations with or without other features and elements of the present invention.

Although the embodiments described herein consider LTE, LTE-A, New Radio (NR) or 5G specific protocols, it is understood that the embodiments described herein are not restricted to this scenario and are applicable to other wireless systems as well.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method implemented by a wireless transmit receive unit (WTRU), the method comprising:
   receiving configuration information, the configuration information indicating that a plurality of physical random access channel (PRACH) preambles are divided into a plurality of PRACH preamble subsets, wherein each PRACH preamble subset is associated with a respective synchronization signal (SS) block index, and preamble indexes of the plurality of PRACH preambles are used to consecutively map each of the plurality of PRACH preambles into one of the respective PRACH preamble subsets; and
   transmitting a first PRACH preamble in a random access channel (RACH) occasion, wherein the first PRACH preamble is indicative of the WTRU selecting the first SS block index associated with the RACH occasion.

2. The method of claim 1, further comprising:
   selecting the RACH occasion based on the first SS block, wherein each SS block index is associated with a respective set of RACH occasions.

3. The method of claim 1, further comprising:
   determining whether the RACH occasion is valid, wherein the RACH occasion is determined to be valid based on at least the RACH occasion being subsequent to one or more SS blocks transmitted in a slot associated with the RACH occasion.

4. The method of claim 1, further comprising:
   receiving the first SS block index;
   selecting the first SS block index; and
   selecting the first PRACH preamble based on selecting the first SS block index.

5. The method of claim 1, wherein the first PRACH preamble is one of the PRACH preambles comprised in a PRACH preamble subset indicated as being associated with the first SS block index by the configuration information.

6. The method of claim 1, wherein each of the respective PRACH preamble subsets comprises PRACH preambles that are different from the PRACH preambles comprised in other PRACH preamble subsets.

7. The method of claim 1, wherein the first SS block is associated with a first transmission beam.

8. The method of claim 1, wherein the first PRACH preamble transmitted in the RACH occasion is associated with a second transmission beam, the second transmission beam being associated with the first transmission beam.

9. The method of claim 1, wherein each of the plurality of SS blocks is associated with a respective transmission beam.

10. A wireless transmit receive unit (WTRU), comprising a processor and memory, wherein the processor and memory are configured to:
    receive configuration information, the configuration information indicating that a plurality of physical random access channel (PRACH) preambles are divided into a plurality of PRACH preamble subsets, wherein each PRACH preamble subset is associated with a respective synchronization signal (SS) block index, and preamble indexes of the plurality of PRACH preambles are used to consecutively map each of the plurality of PRACH preambles into one of the respective PRACH preamble subsets; and
    transmit a first PRACH preamble in a random access channel (RACH) occasion, wherein the first PRACH preamble is indicative of the WTRU selecting a first SS block index associated with the RACH occasion.

11. The WTRU of claim 10, wherein the processor and memory are further configured to:
    receive the first SS block index;
    select a first SS block index; and
    select a first PRACH preamble based on the selection of the first SS block index.

12. The WTRU of claim 10, wherein the first PRACH preamble is one of the PRACH preambles comprised in the PRACH preamble subset indicated as being associated with the first SS block index by the configuration information.

13. The WTRU of claim 10, wherein the processor and memory are further configured to:
   select the RACH occasion based on the first SS block, wherein each SS block index is associated with a respective set of RACH occasions.

14. The WTRU of claim 10, wherein the processor and memory are further configured to:
   determine whether the RACH occasion is valid, wherein the RACH occasion is determined to be valid based on at least the RACH occasion being subsequent to one or more SS blocks transmitted in a slot associated with the RACH occasion.

15. The WTRU of claim 10, wherein each of the respective PRACH preamble subsets comprises PRACH preambles that are different from the PRACH preambles comprised in other PRACH preamble subsets.

16. The WTRU of claim 12, wherein the first SS block is associated with a first transmission beam.

17. The WTRU of claim 10, wherein the first PRACH preamble transmitted in the RACH occasion is associated with a second transmission beam, the second transmission beam being associated with the first transmission beam.

18. The WTRU of claim 10, wherein each of the plurality of SS blocks is associated with a respective transmission beam.

19. A network node, comprising:
   a processor and memory, wherein the processor and memory are configured to:
   transmit configuration information to a wireless transmit/receive unit (WTRU), the configuration information indicating that a plurality of physical random access channel (PRACH) preambles are divided into a plurality of PRACH preamble subsets, wherein each PRACH preamble subset is associated with a respective synchronization signal (SS) block index, and preamble indexes of the plurality of PRACH preambles are used to consecutively map each of the plurality of PRACH preambles into one of the respective PRACH preamble subsets; and
   receive a first PRACH preamble in a random access channel (RACH) occasion, wherein the first PRACH preamble is indicative of the WTRU selecting the first SS block index associated with the RACH occasion.

20. The network node of claim 19, wherein the processor and memory are configured to:
   determine that the WTRU selected the first SS block index is based on the reception of the first PRACH preamble in the RACH occasion.

* * * * *

UNITED STATES PATENT AND TRADEMARK OFFICE
CERTIFICATE OF CORRECTION

PATENT NO. : 12,245,270 B2
APPLICATION NO. : 18/494118
DATED : March 4, 2025
INVENTOR(S) : Kyle Jung-Lin Pan, Fengjun Xi and Chunxuan Ye Page 1 of 1

It is certified that error appears in the above-identified patent and that said Letters Patent is hereby corrected as shown below:

In the Claims

In Claim 16: Column 31, Line 17, delete "The WTRU of claim 12" and insert --The WTRU of claim 10--.

Signed and Sealed this
Thirteenth Day of May, 2025

Coke Morgan Stewart
*Acting Director of the United States Patent and Trademark Office*